United States Patent
Yang et al.

(10) Patent No.: US 12,360,961 B2
(45) Date of Patent: Jul. 15, 2025

(54) HYBRID DATABASE IMPLEMENTATIONS

(71) Applicant: Beijing Oceanbase Technology Co., Ltd., Beijing (CN)

(72) Inventors: Zhifeng Yang, Hangzhou (CN); Quanqing Xu, Hangzhou (CN); Chuanhui Yang, Hangzhou (CN)

(73) Assignee: Beijing OceanBase Technology Co., Ltd., Beijing (CN)

( * ) Notice: Subject to any disclaimer, the term of this patent is extended or adjusted under 35 U.S.C. 154(b) by 0 days.

(21) Appl. No.: 18/505,907

(22) Filed: Nov. 9, 2023

(65) Prior Publication Data
US 2025/0021529 A1 Jan. 16, 2025

Related U.S. Application Data

(63) Continuation of application No. PCT/CN2023/107288, filed on Jul. 13, 2023.

(51) Int. Cl.
*G06F 16/21* (2019.01)
*G06F 16/242* (2019.01)

(52) U.S. Cl.
CPC ........ *G06F 16/211* (2019.01); *G06F 16/2433* (2019.01)

(58) Field of Classification Search
CPC .......................... G06F 16/211; G06F 16/2433
USPC ....................................................... 707/713
See application file for complete search history.

(56) References Cited

U.S. PATENT DOCUMENTS

| | | | |
|---|---|---|---|
| 7,290,056 B1 * | 10/2007 | McLaughlin, Jr. | ......................... H04L 43/0852 709/201 |
| 7,653,668 B1 * | 1/2010 | Shelat | ................... G06F 16/184 707/610 |
| 7,716,179 B1 * | 5/2010 | Agapiev | ............. H04L 67/1076 707/706 |
| 7,739,325 B1 * | 6/2010 | Okita | ..................... G06Q 10/06 709/200 |

(Continued)

FOREIGN PATENT DOCUMENTS

| | | |
|---|---|---|
| CN | 101587491 A | 11/2009 |
| CN | 102118264 A | 7/2011 |

(Continued)

OTHER PUBLICATIONS

AB MySQL, Wiley Publishing, 2001, Chapter 18-20, 35 pages.

(Continued)

*Primary Examiner* — Hanh B Thai
(74) *Attorney, Agent, or Firm* — Fish & Richardson P.C.

(57) ABSTRACT

Disclosed herein are methods, systems, and apparatus, including computer programs encoded on computer storage media, for implementing a hybrid database. In an example method, a system receives an indication to process a data request. The system is configured as a hybrid database to dynamically switch between a stand-alone mode and a distributed mode. When the indication indicates to the system to process the data request in the stand-alone mode, the system switches the hybrid database to the stand-alone mode and processes the data request in the stand-alone mode. When the indication indicates to the system to process the data request in the distributed mode, the system switches the hybrid database to the distributed mode and processes the data request in the distributed mode.

20 Claims, 10 Drawing Sheets

(56) References Cited

U.S. PATENT DOCUMENTS

| | | | | |
|---|---|---|---|---|
| 7,870,122 | B2* | 1/2011 | Nath | G06F 16/2246 |
| | | | | 707/715 |
| 8,495,131 | B2* | 7/2013 | Ahuja | G06F 11/2046 |
| | | | | 709/219 |
| 8,548,986 | B2* | 10/2013 | Surna | G06F 16/24557 |
| | | | | 707/718 |
| 8,812,482 | B1* | 8/2014 | Kapoor | G06F 16/273 |
| | | | | 707/706 |
| 10,120,904 | B2* | 11/2018 | Ranganathan | G06F 16/182 |
| 10,235,440 | B2* | 3/2019 | Lee | G06F 16/2455 |
| 10,572,510 | B2* | 2/2020 | Lee | G06F 16/275 |
| 10,909,091 | B1 | 2/2021 | Shah et al. | |
| 11,016,969 | B1* | 5/2021 | Chen | G06F 16/24528 |
| 11,397,711 | B1 | 7/2022 | Krishnamurthy et al. | |
| 11,488,080 | B1* | 11/2022 | Simms | G06Q 10/06312 |
| 11,503,075 | B1* | 11/2022 | Sirianni | H04L 63/1416 |
| 11,669,518 | B1* | 6/2023 | Chan | G06F 16/2308 |
| | | | | 707/607 |
| 11,726,976 | B1* | 8/2023 | Brossard | G06F 16/248 |
| | | | | 707/702 |
| 11,789,922 | B1* | 10/2023 | Jain | G06F 9/466 |
| | | | | 707/703 |
| 11,809,425 | B1* | 11/2023 | Balakrishnan | G06F 21/53 |
| 2003/0055929 | A1* | 3/2003 | Ding | H04L 41/00 |
| | | | | 709/201 |
| 2005/0091344 | A1* | 4/2005 | Chen | H04L 67/63 |
| | | | | 709/219 |
| 2005/0149634 | A1* | 7/2005 | McKenney | G06F 9/52 |
| | | | | 709/248 |
| 2007/0198792 | A1* | 8/2007 | Dice | G06F 12/0815 |
| | | | | 711/163 |
| 2010/0042511 | A1* | 2/2010 | Sundaresan | G06Q 10/10 |
| | | | | 726/8 |
| 2010/0223383 | A1* | 9/2010 | Salevan | H04L 67/1031 |
| | | | | 709/226 |
| 2010/0235496 | A1* | 9/2010 | Zhao | H04L 43/16 |
| | | | | 709/224 |
| 2010/0241646 | A1 | 9/2010 | Friedman | |
| 2010/0306783 | A1* | 12/2010 | Dake | G06F 9/546 |
| | | | | 709/217 |
| 2012/0084364 | A1* | 4/2012 | Sivavakeesar | H04W 4/60 |
| | | | | 709/205 |
| 2012/0310423 | A1* | 12/2012 | Taft | H02J 13/00006 |
| | | | | 700/286 |
| 2012/0310558 | A1* | 12/2012 | Taft | G06Q 30/00 |
| | | | | 702/61 |
| 2012/0310559 | A1* | 12/2012 | Taft | H02J 13/00002 |
| | | | | 702/62 |
| 2013/0132408 | A1* | 5/2013 | Little | G06F 16/2255 |
| | | | | 707/754 |
| 2013/0282650 | A1* | 10/2013 | Zhang | G06F 16/283 |
| | | | | 707/E17.056 |
| 2014/0214784 | A1* | 7/2014 | Seo | G06F 16/245 |
| | | | | 707/703 |
| 2014/0279920 | A1* | 9/2014 | Madhavarapu | G06F 16/2365 |
| | | | | 707/649 |
| 2014/0337393 | A1* | 11/2014 | Burchall | G06F 16/2379 |
| | | | | 707/826 |
| 2015/0113314 | A1* | 4/2015 | Bulkowski | G06F 11/203 |
| | | | | 714/4.11 |
| 2016/0087841 | A1* | 3/2016 | Bharadwaj | H04L 67/303 |
| | | | | 709/221 |
| 2016/0173338 | A1* | 6/2016 | Wolting | H04L 45/64 |
| | | | | 709/223 |
| 2016/0188594 | A1* | 6/2016 | Ranganathan | G06F 9/5066 |
| | | | | 707/769 |
| 2016/0246785 | A1* | 8/2016 | Sun | G06F 16/278 |
| 2017/0068748 | A1* | 3/2017 | Hu | G06F 16/9017 |
| 2018/0025052 | A1* | 1/2018 | Nambiar | G06F 16/2453 |
| | | | | 707/713 |
| 2018/0109495 | A1* | 4/2018 | Vasseur | H04L 63/0245 |
| 2018/0157481 | A1* | 6/2018 | Zessin | H04W 4/38 |
| 2019/0196918 | A1* | 6/2019 | Bulkowski | G06F 16/2365 |
| 2019/0342383 | A1* | 11/2019 | Matican | G06F 9/5077 |
| 2020/0089942 | A1* | 3/2020 | Man | G06N 20/00 |
| 2020/0090316 | A1* | 3/2020 | Man | G06T 1/20 |
| 2020/0348662 | A1* | 11/2020 | Cella | G05B 19/41865 |
| 2020/0396282 | A1* | 12/2020 | Matican | G06F 3/0619 |
| 2021/0034598 | A1* | 2/2021 | Arye | G06F 16/288 |
| 2021/0109874 | A1* | 4/2021 | Chen | G06F 3/0634 |
| 2021/0157312 | A1* | 5/2021 | Cella | G01M 13/045 |
| 2021/0382987 | A1* | 12/2021 | Shanbhogue | G06F 12/0811 |
| 2022/0164210 | A1* | 5/2022 | Guendert | G06F 16/188 |
| 2022/0188325 | A1* | 6/2022 | Galanis | G06F 16/24524 |
| 2022/0358106 | A1* | 11/2022 | Krishnamurthy | H04L 67/141 |
| 2022/0358185 | A1* | 11/2022 | Newman | G06F 16/211 |
| 2023/0076849 | A1* | 3/2023 | Matsuoka | G06Q 10/06316 |
| 2023/0337008 | A1* | 10/2023 | Haustein | H04W 16/14 |
| 2023/0409552 | A1* | 12/2023 | Brossard | G06F 16/248 |
| 2024/0256572 | A1* | 8/2024 | Toste Gomes | G06F 16/27 |
| 2024/0320069 | A1* | 9/2024 | Tong | G06F 9/547 |

FOREIGN PATENT DOCUMENTS

| | | |
|---|---|---|
| CN | 105069149 A | 11/2015 |
| CN | 105930381 A | 9/2016 |
| CN | 107787490 A | 3/2018 |
| CN | 113934763 A | 1/2022 |
| CN | 115576969 A | 1/2023 |
| CN | 115658245 A | 1/2023 |

OTHER PUBLICATIONS

Al-Houmaily et al., "Two-phase commit in gigabit-networked distributed databases," Proceedings of International Conference on Parallel and Distributed Computing Systems (PDCS), Sep. 1995, 7 pages.

Barthels et al., "Strong consistency is not hard to get: Two-Phase Locking and Two-Phase Commit on Thousands of Cores," Proceedings of the VLDB Endowment, Sep. 2019, 12(13):2325-2338.

Bernstein et al., "Multiversion concurrency control—theory and algorithms," ACM Transactions on Database Systems (TODS), Dec. 1, 1983, 8(4):465-483.

Carey et al., "The performance of multiversion concurrency control algorithms," ACM Transactions on Computer Systems (TOCS), Sep. 1, 1986, 4(4):338-378.

Gray et al., "Consensus on transaction commit," ACM Transactions on Database Systems (TODS), Mar. 1, 2006, 31(1)133-160.

International Search Report and Written Opinion in International Appln. No. PCT/CN2023/107262, mailed on Jan. 5, 2024, 7 pages.

O'Neil et al., "The log-structured merge-tree (LSM-tree)," Acta Informatica, Jun. 1996, 33:351-385.

Oceanbase, "From 0.5 to 4.0, the technological evolution of OceanBase single-machine distributed integration," Proceedings of 13th China Database Technology Conference (DTCC 2022), Dec. 14-16, 2022, 36 pages (with English translation).

Ono et al., "FlexDAS: A flexible direct attached storage for I/O intensive applications," 2014 IEEE International Conference on Big Data (Big Data), Oct. 27, 2014, p. 147-152.

Samaras et al., "Two-phase commit optimizations in a commercial distributed environment," Distributed and Parallel Databases, Oct. 1995, 3:325-360.

Vinçon et al., "Near-data processing in database systems on native computational storage under HTAP workloads," Proceedings of the VLDB Endowment, Jun. 2022, 15(10):1991-2004.

Yang et al., "OceanBase: A 707 Million tpmC Distributed Relational Database System," Proceedings of the VLDB Endowment, Aug. 1, 2022, 15(12):3385-3397.

U.S. Appl. No. 18/506,032, filed Nov. 9, 2023, Quanging Xu.

U.S. Appl. No. 18/505,874, filed Nov. 9, 2023, Zhifeng Yang.

baijiahao.baidu.com [online], "OceanBase Analysis: How to combine the advantages of stand-alone database and distributed database?," Apr. 21, 2023, retrieved from URL<https://baijiahao.baidu.com/s?id=1763773606853763914&wfr=spider&for=pc>, 8 pages (with English translation).

(56) References Cited

OTHER PUBLICATIONS baijiahao.baidu.com [online], "OceanBase Chief Architect Yang Zhifeng: The Real Meaning of single-machine distributed integration is three points," Apr. 21, 2023, retrieved from URL<https://baijiahao.baidu.com/s?id=1763778606777594015&wfr=spider&for=pc>, 9 pages (with English translation).

International Search Report and Written Opinion in International Appin. No. PCT/CN2023/107254, mailed on Dec. 27, 2023, 7 pages.

International Search Report and Written Opinion in International Appln. No. PCT/CN2023/107288, mailed on Dec. 26, 2023, 7 pages.

* cited by examiner

HYBRID DATABASE IMPLEMENTATIONS

CROSS-REFERENCE TO RELATED APPLICATIONS

This application is a continuation of PCT Application No. PCT/CN2023/107288, filed on Jul. 13, 2023, which is hereby incorporated by reference in its entirety.

TECHNICAL FIELD

The following disclosure generally relates to database implementations, and more specifically, to methods and systems related to implementations of a hybrid database.

BACKGROUND

A database is a structured collection of data that is organized and stored in a systematic manner. It serves as a central repository for storing and managing various types of information, such as text, numbers, images, and more. Databases are designed to store and retrieve data, providing a structured approach to data management.

SUMMARY

Databases are often categorized into two types: centralized (or stand-alone) databases and distributed databases. Distributed databases can offer improved fault tolerance and stronger horizontal scalability compared to centralized databases. However, an optimal choice between the two depends on enterprise scale. Large enterprises require a complex network of distributed database nodes to handle a significant amount of data. Conversely, small or startup companies with lower workloads can meet their needs with a stand-alone database. Mainstream distributed databases often overlook the performance needs of small and medium-sized enterprises when it comes to stand-alone databases, resulting in potentially inferior performance for distributed databases in small-scale environments due to their intricate internal architecture. If users opt for a stand-alone database to avoid such issues, they may face the challenge of frequent data migration or even database replacement as their enterprise grows. Consequently, small and medium-sized enterprises face a dilemma when choosing between a centralized database and a distributed database.

With reference to some implementations of the present disclosure, described below is a scalable architecture that integrates stand-alone and distributed databases, catering to enterprises of varying sizes, including large, medium, and small enterprises. This architecture enables elastic scalability and seamless transitions between stand-alone and distributed database services while maintaining optimal performance.

In a general aspect, a system performs a method that includes: receiving an indication to process a data request, where the system is configured as a hybrid database to dynamically switch between a stand-alone mode and a distributed mode; when the indication indicates to the system to process the data request in the stand-alone mode, switching the hybrid database to the stand-alone mode, and processing the data request in the stand-alone mode; and when the indication indicates to the system to process the data request in the distributed mode, switching the hybrid database to the distributed mode, and processing the data request in the distributed mode. Particular implementations may include one or more of the following features.

In some implementations, the system includes a plurality of computer nodes, and each computer node of the plurality of computer nodes comprises a structured query language (SQL) engine, a transaction engine, and a storage engine.

In some implementations, the hybrid database comprises a SQL layer, a transaction layer, and a storage layer. The SQL layer comprises a plurality of SQL engines, wherein each SQL engine of the plurality of SQL engine is a SQL engine comprised in one of the plurality of computer nodes. The transaction layer comprises a plurality of transaction engines, wherein each transaction engine of the plurality of transaction engines is a transaction engine comprised in one of the plurality of computer nodes. The storage layer comprises a plurality of storage engines, wherein each storage engine of the plurality of storage engines is a storage engine comprised in one of the plurality of computer nodes.

In some implementations, the data request comprises a transaction or a SQL query.

In some implementations, processing the data request in the stand-alone mode, comprises: processing, using a single-process-multiple-thread model, the data request.

In some implementations, processing the data request in the stand-alone mode, comprises: processing, using one or more function calls, the data request by a particular computer node of the system.

In some implementations, processing the data request in the distributed mode, comprises: processing, using one or more remote procedure calls (RPCs) by the plurality of computer nodes, the data request.

In some implementations, the hybrid database comprises a plurality of tenants. When the hybrid database is switched to the stand-alone mode, each one of the plurality of tenants is a stand-alone type of tenant. When the hybrid database is switched to the distributed mode, each one of the plurality of tenants is a stand-alone type of tenant; or at least one of the plurality of tenants is a distributed type of tenant.

Implementations include a system comprising a plurality of computer nodes. The system is configured to perform the above-described operations.

Implementations further include an apparatus. The apparatus is configured to perform the previously described operations.

The details of one or more implementations of the subject matter of this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
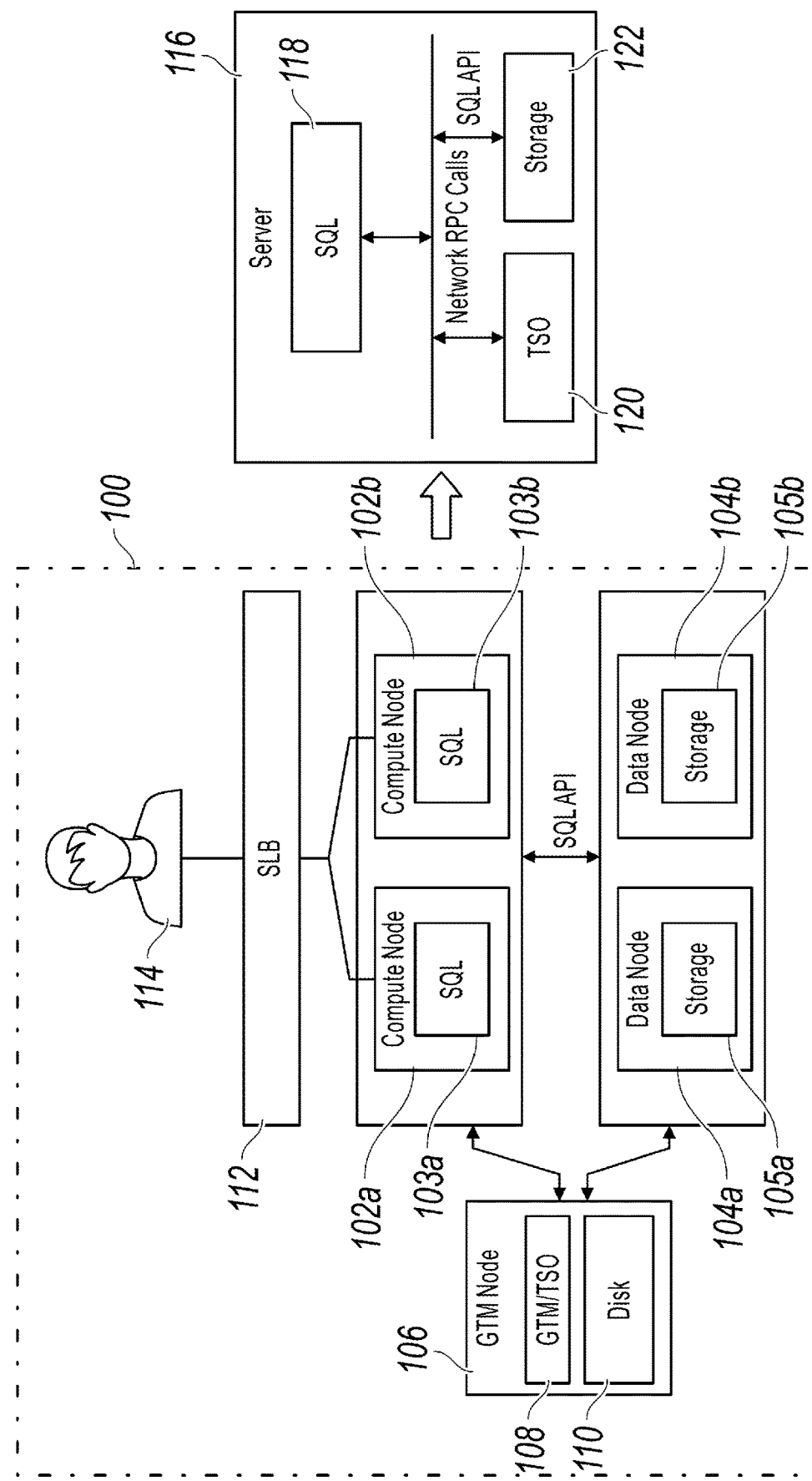
FIG. 1 shows a diagram of an example deployment of a distributed database in a stand-alone server, in accordance with some implementations of the present disclosure.

FIG. 1 shows a diagram of an example deployment of a distributed database 100 in a stand-alone server 116, in accordance with some implementations of the present disclosure. As shown, distributed database 100 includes compute nodes 102a and 102b, data nodes 104a and 104b, global transaction manager (GTM) node 106, and server load balancing (SLB) node 112. Note that distributed database 100 is shown to include two compute nodes and two data nodes for illustrative purposes only. In some implementations, distributed database 100 can include any suitable number of compute nodes and data nodes.

In some implementations, each one of computing nodes 102a and 102b includes hardware components such as processors, memories, storage devices, and network interfaces for communication. Each one of compute nodes 102a and 102b can further include software components, including database management system (DMBS) and related services.

In the shown example, compute nodes 102a and 102b includes structured query language (SQL) engines 103a and 103b, respectively. Each one of SQL engines 103a and 103b can be a software component or system that processes data requests within distributed database 100. In some implementations, each one of SQL engines 103a and 103b is configured to execute SQL queries and manage database operations. In some implementations, each one of SQL engines 103a and 103b is configured to process SQL queries, optimize their execution, retrieve and manipulate data, and ensure the integrity and efficiency of database operations.

In some implementations, each one of SQL engines 103a and 103b is configured to perform parsing and validation of SQL queries. For example, each one of SQL engines 103a and 103b can parse SQL statements, check their syntax, and ensure they conform to the rules and structures of the SQL language by verifying the existence and validity of database objects, such as tables and columns, referenced in the queries.

In some implementations, each one of SQL engines 103a and 103b is configured to perform query optimization. For example, each one of SQL engines 103a and 103b can analyze the structure of the SQL query and generate an optimized execution plan to determine a most efficient way to access and retrieve data based on available indexes, statistics, and algorithms. In some examples, SQL engines 103a and 103b can rewrite a query to an equivalent but more efficient form, for example, by rearranging joins or eliminate unnecessary operations. SQL engines 103a and 103b can examine the available indexes on the tables involve in the query and determine the most appropriate indexes to use.

SQL engines 103a and 103b can estimate the cost of various execution plans and select the one with the lowest cost based on factors such as I/O operations. CPU usage, memory requirement, and network latency. If the engine has previously executed the same or a similar query, it can reuse the results from the query cache instead of re-executing the query.

In some implementations, each one of SQL engines 103a and 103b is configured to perform data retrieval and manipulation. For example, each one of SQL engines 103a and 103b can execute the SQL query against the database once the SQL query is validated and optimized. SQL engines 103a and 103b can check the query's syntax to ensure it conforms to the SQL language rules, for example, by verifying that the query is properly structured and includes the necessary keywords, clauses, and punctuation. SQL engines 103a and 103b can perform semantic analysis to validate the query against the database scheme, for example, by checking the existence of tables and columns referenced in the query, resolving aliases and expression, and verifying the compatibility of data types. SQL engines 103a and 103b can enforce access control rules to ensure that the user executing the query has the necessary permission to access the requested data, for example, by checking the user's privileges against the database's security model. Each one of SQL engines 103a and 103b can retrieve data from one or more tables based on specified conditions, perform any requested calculations or aggregations, and apply sorting or filtering as necessary. Each one of SQL engines 103a and 103b can handle operations such as inserting, updating, or deleting data based on the provided SQL statements.

In some implementations, each one of SQL engines 103a and 103b is configured to perform concurrency control and transaction management to ensure data integrity and consistency in multi-user environments. For example, each one of SQL engines 103a and 103b can manage concurrent transactions, handle locks, and coordinate access to shared resources to prevent conflicts and maintain data integrity.

In some implementations, each one of SQL engines 103a and 103b is configured to perform error handling and logging. For example, each one of SQL engines 103a and 103b can capture and report any errors or exceptions that occur during query execution. Each one of SQL engines 103a and 103b can generate informative error messages to help diagnose and resolve issues. Each one of SQL engines 103a and 103b can log query execution details, including query plans, execution time, and resource utilization, for monitoring and troubleshooting purposes.

Distributed database 100 further includes data nodes 104a and 104b. In some implementations, each one of data nodes 104a and 104b includes hardware components such as processors, memories, storage devices, and network interfaces for communication. Each one of data nodes 104a and 104b can further include software components, including DMBS and related services.

In the shown example, data nodes 104a and 104b include storage engines 105a and 105b, respectively. Each one of storage engines 105a and 105b can be a software component or system that stores, retrieves, and manages data within distributed database 100. In some implementations, each one of storage engines 105a and 105b is configured to manage the physical storage and retrieval of data within distributed database 100. In some examples, each one of storage engines 105a and 105b can be configured to handle data storage formats, read and write operations, indexing, concurrency control, caching, durability, and recovery. In some implementations, storage engines 105a and 105b work in conjunction with SQL engines 103a and 103b to provide efficient and reliable data storage and retrieval capabilities.

In some implementations, each one of storage engines 105a and 105b is configured to define a data storage format. For example, each one of storage engines 105a and 105b can determine how data is structured and stored within distributed database 100. Each one of storage engines 105a and 105b can define the physical representation of tables, rows, columns, indexes, and other database objects. Each one of storage engines 105a and 105b can handle data serialization, compression, and encoding to optimize storage efficiency and minimize disk space usage.

In some implementations, each one of storage engines 105a and 105b is configured to perform read and write operations. For example, each one of storage engines 105a and 105b can handle the reading and writing of data to and from storage media. Each one of storage engines 105a and 105b can translate high-level commands and queries from SQL engines 103a and 103b into low-level operations on disk or in memory, including fetching data, inserting, updating, or deleting records, and managing data buffers and caches for efficient access.

In some implementations, each one of storage engines 105a and 105b is configured to perform indexing and search. For example, each one of storage engines 105a and 105b can manage indexes, which are data structures that enhance data retrieval speed by providing efficient lookup mechanisms. Each one of storage engines 105a and 105b can support various types of indexes, such as B-trees or hash indexes, to enable fast searching and retrieval of data based on specified criteria.

In some implementations, each one of storage engines 105a and 105b is configured to perform concurrency control and locking. For example, each one of storage engines 105a and 105b can enforce concurrency control mechanisms to ensure data consistency in multi-user environments. Each one of storage engines 105a and 105b can handle locks and transactions, coordinating access to shared data to prevent conflicts and maintain data integrity.

In some implementations, each one of storage engines 105a and 105b is configured to perform buffer management and caching. For example, each one of storage engines 105a and 105b can maintain data buffers and caches in memory to improve performance. Each one of storage engines 105a and 105b can use techniques such as page caching or buffer pools to hold frequently accessed data in memory, reducing disk I/O and speeding up read operations.

In some implementations, each one of storage engines 105a and 105b is configured to perform recovery. For example, each one of storage engines 105a and 105b can implement mechanisms for data persistence and recovery in the event of failures to ensure the durability of data. Each one of storage engines 105a and 105b can manage transaction logs or write-ahead logs (WALs), allowing the system to restore the database to a consistent state after crashes or power outages.

In some implementations, each one of storage engines 105a and 105b is configured to perform file and file system management. For example, each one of storage engines 105a and 105b can interact with the underlying file system to create and manage database files. Each one of storage engines 105a and 105b can handle file allocation, space management, and I/O operations, including reading and writing data blocks or pages on disk.

Distributed database 100 further includes GTM node 106. In some implementations, GTM node 106 includes hardware components, such as processors, memories, storage devices, network interfaces for communication, and software components for performing operations as described herein. As shown, GTM node 106 includes a global-transaction-manager/timestamp-oracle (GTM/TSO) engine 108 and disk 110. In some implementations, GTM/TSO engine 108 is a software component or system that coordinates and manages global transactions across multiple database nodes.

In some implementations, GTM/TSO engine 108 is configured to perform transaction coordination. For example, GTM/TSO engine 108 can initiate, manage, and monitor the execution of distributed transactions that involve multiple database nodes. GTM/TSO engine 108 can ensure that all participating nodes agree on the outcome of the transaction, either committing or rolling back the changes.

In some implementations, GTM/TSO engine 108 is configured to perform transaction identification. For example, GTM/TSO engine 108 can assign a unique identifier to each global transaction. This identifier can be used to track and correlate the transactional operations performed on different database nodes, which enables GTM node 106 to maintain a global view of the transaction's progress and state.

In some implementations, GTM/TSO engine 108 is configured to employ a commit protocol to achieve atomicity across distributed transactions. For example, GTM/TSO engine 108 can coordinate the agreement between the participating nodes to either commit or abort the transaction. GTM/TSO engine 108 can ensure that all nodes are ready to commit before finalizing the transaction, and in case of any failures or inconsistencies, it coordinates the rollback of the transaction.

In some implementations, GTM/TSO engine 108 is configured to perform distributed lock management. For example, GTM/TSO engine 108 can manage distributed locks to ensure proper isolation and concurrency control in global transactions. GTM/TSO engine 108 can coordinate the acquisition and release of locks across different database nodes to prevent conflicts and maintain data consistency during concurrent access.

In some implementations, GTM/TSO engine 108 is configured to perform transaction recovery. For example, GTM/TSO engine 108 can log the progress and state of global transactions and facilitate recovery mechanisms to restore the system to a consistent state, including resuming or rolling back incomplete transactions after system restarts or failures.

In some implementations, GTM/TSO engine 108 is configured to provide fault tolerance and high availability. For example, GTM/TSO engine 108 can incorporate replication or clustering techniques to ensure that there is no single point of failure. In some implementations, multiple GTM nodes 106 are deployed for redundancy and to handle failover scenarios, ensuring continuous transaction management in the event of node failures.

In some implementations, disk 110 in GTM node 106 is a physical storage device used for storing and retrieving digital data. In some implementations, disk 110 is configured to store data and transaction-related information. For example, disk 110 can be a persistent storage medium for transaction logs, metadata, and transaction state information. In some implementations, disk 110 is configured to enable transaction durability, recovery, fault tolerance, and to ensure consistent transaction management across a distributed database system (such as, distributed database 100).

In some implementations, disk 110 is configured to perform transaction logging. For example, disk 110 can store transaction logs used to capture the sequence of operations performed within each global transaction. The transaction logs help ensure transaction durability and facilitate recovery in case of failures. Disk 110 acts as a reliable and persistent storage medium for storing these logs, enabling GTM node 106 to replay or to recover transactions as needed.

In some implementations, disk 110 is configured as a metadata storage. For example, disk 110 can hold metadata related to global transactions. The metadata can include information about transaction identifiers, participating database nodes, transaction states, locks, and other transaction-related details. By storing this information on disk, GTM node 106 can maintain a consistent and reliable view of the ongoing global transactions, even in the event of system failures or restarts.

In some examples, disk 110 can provide transaction state persistence by persisting the state of global transactions, and disk 110 can provide fault tolerance and recovery mechanisms in GTM node 106. For example, GTM node 106 can use disk 110 to keep track of the progress and state of each transaction, such as whether it is active, committed, or rolled back. By storing the transaction state information on disk 110, GTM node 106 ensures that transaction states are durable and can be recovered in case of system failures or restarts. By storing transaction logs and metadata on disk 110, GTM node 106 can recover the system to a consistent state after failures or crashes, which allows GTM node 106 to restore ongoing transactions, recover lost data, and resume transaction processing from the point-of-failure.

In some implementations, SLB node 112 is configured to distribute incoming client requests across multiple database servers/nodes to achieve load balancing and improve overall performance and scalability. SLB node 112 can act as an intermediary between clients (for example, client 114) and the database servers (for example, compute nodes 103a or 103b), routing requests to ensure efficient resource utilization and even distribution of workload.

In some implementations, SLB node 112 is configured to perform request distribution. For example, SLB node 112 can receive incoming client requests and determine an appropriate database server to handle each request. Load balancing algorithms can be employed to evenly distribute the workload among the available database servers based on factors such as server capacity, current load, and response times.

In some implementations, SLB node 112 is configured to provide health monitoring of the database. For example, SLB node 112 can monitor the health and availability of database servers and perform health checks and monitors server performance metrics such as CPU usage, memory utilization, network latency, and response times. In some examples, if a server becomes unresponsive or experiences performance issues, SLB node 112 can route requests away from that server until it becomes available again.

In some implementations, SLB node 112 is configured to perform connection management. For example, SLB node 112 can manage client connections to the database servers. SLB node 112 can maintain a pool of database connections and assigns them to client requests as needed, which helps optimize resource usage and minimizes the overhead of establishing and tearing down connections for each client request.

By distributing client requests across multiple database servers, SLB node 112 can enable horizontal scalability. Additional database servers can be added to the infrastructure, and SLB node 112 can dynamically adjust the request distribution to accommodate the increased capacity. It also enhances high availability by providing failover support. If a database server fails, the load balancing node can route requests to other available servers, ensuring uninterrupted service. In some examples, SLB node 112 can optimize performance by performing request routing based on factors such as geographic location, network proximity, or specific workload characteristics. SLB node 112 can direct requests to the nearest or least congested database server, reducing network latency and improving overall response times.

In some examples, an operating process of distributed database 100 can start when a client 114 sends SQL queries to distributed database 100 for data retrieval or modification. The client 114 interacts with SLB node 112, which acts as the entry point for client requests. SLB node 112 receives incoming client requests and employs load balancing algorithms to distribute the workload across multiple compute nodes, for example, compute nodes 102a and 102b. SLB node 112 can perform load balancing based on factors like server capacity, current load, and response times to ensure even distribution of requests and optimal resource utilization.

Compute nodes 102a and 102b receive the client requests from SLB node 112. Each SQL engine, for example, 103a or 103b, is responsible for processing the SQL queries assigned to a respective compute node. SQL engine 103a and 103b can parse and validate the queries, generate query execution plans, and interact with the storage engines to retrieve and manipulate the requested data.

Compute nodes 102a and 103b can interact with data nodes 104a and 104b to access and manage the data storage. Storage engines 105a and 105b in data nodes 104a and 104b can handle data storage formats, read and write operations, indexing, concurrency control, caching, and durability. Storage engines 105a and 105b can retrieve and update data based on the instructions from the SQL engines.

GTM node 106 oversees global transactions that span multiple database servers, for example, compute nodes 102a and 102b, and data nodes 104a and 104b. GTM node 106 can act as the central coordinator, assigning unique identifiers to transactions, managing transaction state and metadata, and ensuring transactional integrity and concurrency control. GTM node 106 can also facilitate a commit protocol for distributed transaction coordination.

As compute nodes 102a and 102b execute queries and retrieve data from data nodes 104a and 104b, they exchange information and coordinate data consistency through GTM node 106. GTM node 106 ensures that all participating database servers agree on the outcome of global transactions, coordinating commit or rollback operations across the distributed database.

Once compute nodes 102a and 102b complete query execution and retrieve the necessary data, they can compile the results and send them back to the requesting client application. SLB node 112 can aggregate and forward the query results from compute nodes 102a and 102b back to client 114.

This operating process involving compute nodes 102a and 102b, data nodes 104a and 104b, GTM node 106, and SLB node 112 can enable efficient and coordinated operations in a distributed database system. It can allow for load balancing, distributed query processing, transaction management, and optimal utilization of resources to provide scalable and reliable data services.

In some implementations, distributed database 100 is implemented on a stand-alone machine, for example, server 116. As shown, server 116 includes SQL engine 118, TSO engine 120, and storage engine 122. In some implementations, SQL engine 118, TSO engine 120, and storage engine 122 are similar to SQL engines 103a and 103b, GTM/TSO engine 108, and storage engines 105a and 105b, respectively. Accordingly, in such implementations, SQL engine 118, TSO engine 120, and storage engine 122 are configured to perform operations similar to those described with respect to SQL engines 103a and 103b, GTM/TSO engine 108, and storage engines 105a and 105b, in addition or as an alternative to the operations described below. Some descriptions of SQL engine 118, TSO engine 120, and storage engine 122 are omitted here for brevity.

In some examples, when implementing the distributed architecture to a single machine to simulate a stand-alone mode, the inclusion of various components (for example, engines) from the distributed database introduces additional communication delays, for example, delays caused by network remote procedure calls (RPCs) between the components of server 116. Consequently, the stand-alone performance of the distributed database tends to be sub-optimal compared to that of pure stand-alone databases.

Figure 2:
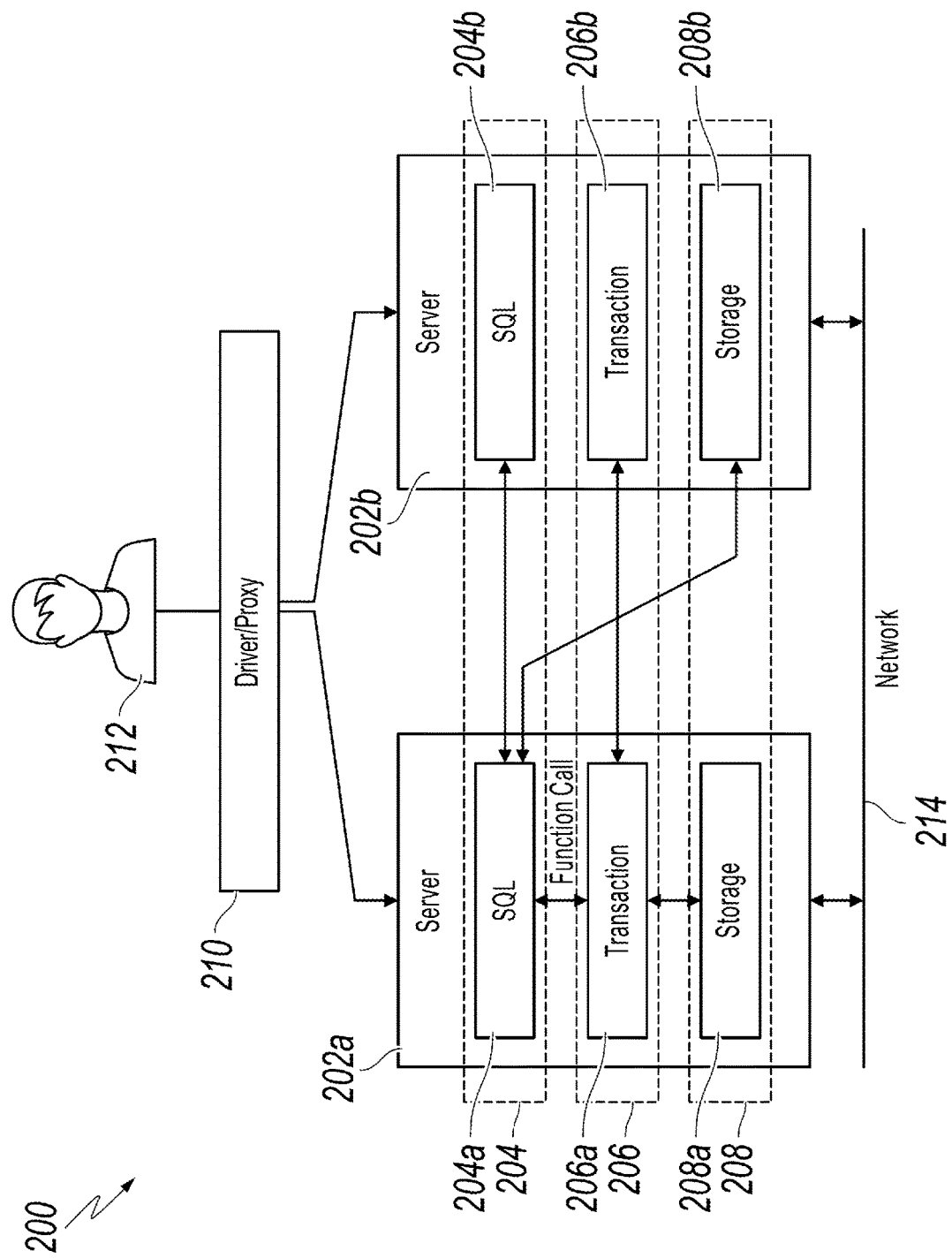
FIG. 2 shows a block diagram of an example hybrid database, in accordance with some implementations of the present disclosure.

FIG. 2 shows a block diagram of an example hybrid database 200, in accordance with some implementations of the present disclosure. As shown, hybrid database 200 includes servers 202a and 202b, and driver/proxy node 210. Note that hybrid database 200 is shown to include two servers for illustrative purposes only. In some implementations, hybrid database 200 can include any suitable number of servers, for example, a few hundred or a few thousand servers.

In some implementations, each one of servers 202a and 202b includes hardware components such as processors, memories, storage devices, and network interfaces for communication. Each one of servers 202a and 202b can further include software components for performing the operations as described herein.

In the shown example, server 202a includes SQL engine 204a, transaction engine 206a, and storage engine 208a. Server 202b includes SQL engine 204b, transaction engine 206b, and storage engine 208b. SQL engines 204a and 204b form SQL layer 204, transactions engines 206a and 206b form transaction layer 206, and storage engines 208a and 208b form storage layer 208.

In some implementations, SQL engines 204a and 204b are similar to SQL engines 103a and 103b. Storage engines 208a and 208b are similar to storage engines 105a and 105b. Accordingly, in such implementations, SQL engines 204a and 204b are configured to perform operations similar to those described with respect to SQL engines 103a and 103b, and storage engines 208a and 208b are configured to perform operations similar to those described with respect to storage engines 105a and 105b, in addition or as an alternative to the operations described below. Some descriptions of SQL engines 204a and 204b, and storage engines 208a and 208b are omitted here for brevity.

In some implementations, each one of transaction engines 206a and 206b is a software component or system that manages and controls execution of database transactions. Transaction engines 206a and 206b can be used to facilitate the ACID properties (atomicity, consistency, isolation, durability) of transactions, providing reliability, integrity, and concurrency control in a multi-user environment.

In some implementations, each one of transaction engines 206a and 206b is configured to perform transaction coordination. For example, each one of transaction engines 206a and 206b can initiate and manage the lifecycle of transactions, ensuring their proper execution and completion. Each one of transaction engines 206a and 206b can oversee the ordering and sequencing of transactional operations and maintains transactional consistency.

In some implementations, each one of transaction engines 206a and 206b is configured to perform concurrency control. For example, each one of transaction engines 206a and 206b can manage concurrent access to the database by multiple users or applications. Each one of transaction engines 206a and 206b can employ concurrency control mechanisms, such as locks or isolation levels, to prevent conflicts and maintain data integrity. This allows transactions to execute in a controlled and consistent manner, even when multiple transactions are accessing the same data concurrently.

In some implementations, each one of transaction engines 206a and 206b is configured to provide atomicity property of transactions, where a transaction is treated as an indivisible unit of work. In some examples, if any part of a transaction fails or encounters an error, each one of transaction engines 206a and 206b can roll back the entire transaction, reverting any changes made until that point. It also ensures the durability property, which guarantees that committed changes are permanent and survive system failures.

In some implementations, each one of transaction engines 206a and 206b is configured to provide transaction isolation. For example, each one of transaction engines 206a and 206b can provide isolation between concurrent transactions. It can ensure that each transaction operates as if executed in isolation, without interference from other transactions. This can also prevent data inconsistencies or conflicts caused by concurrent updates and maintains the integrity of the database.

In some implementations, each one of transaction engines 206a and 206b is configured to perform logging and recovery. For example, each one of transaction engines 206a and 206b can log transactional operations and maintain a transaction log. The log records the sequence of changes made by each transaction, allowing for recovery and rollback in case of system failures or crashes. It enables the transaction engine to restore the database to a consistent state and replay or undo transactions as necessary.

In some implementations, each one of transaction engines 206a and 206b is configured to perform commit and rollback. For example, each one of transaction engines 206a and 206b can verify that a transaction has met all necessary conditions for committing, ensuring that changes made by the transaction are applied permanently to the database. In case of a rollback, each one of transaction engines 206a and 206b can undo all changes made by the transaction, restoring the database to its state prior to the transaction's execution.

Hybrid database 200 further includes driver/proxy node 210. In some implementations, driver/proxy node 210 is an intermediary or middle-tier component that sits between clients or client applications (for example, client 212) and the database servers (for example, servers 202a and 202b). Driver/proxy node 210 can be configured to handle database connections, requests, and queries. In some implementations, driver/proxy node 210 includes hardware components such as processors, memories, storage devices, and network interfaces for communication. Driver/proxy node 210 can further include software components for performing the operations as described herein.

In some implementations, driver/proxy node 210 is configured to perform connection pooling. For example, driver/proxy node 210 can maintain a pool of established connections to the database servers. Driver/proxy node 210 can manage these connections and assigns them to client applications as needed, reducing the overhead of establishing and tearing down connections for each request.

In some implementations, driver/proxy node 210 is configured to perform query routing. For example, driver/proxy node 210 can route client queries to the appropriate database server based on factors such as load balancing, database availability, or query characteristics. Driver/proxy node 210 can distribute the workload evenly across multiple database servers, optimizing resource utilization and query response times.

In some implementations, driver/proxy node 210 is configured to perform caching. For example, driver/proxy node 210 can incorporate caching mechanisms to improve query performance and reduce the load on database servers. Driver/proxy node 210 can cache query results, frequently accessed data, or even entire database tables.

In some implementations, driver/proxy node 210 is configured to perform authentication. For example, driver/proxy node 210 can authenticate client connections, enforce user access controls, and ensure data privacy and integrity. Driver/proxy node 210 can also implement encryption and secure communication protocols between clients and the database servers.

In some implementations, driver/proxy node 210 is configured to perform query optimization. For example, driver/proxy node 210 can analyze incoming queries, rewrite or optimize them for better performance, and utilize database-specific features or optimizations.

In some implementations, driver/proxy node 210 is configured to perform monitoring and logging. For example, driver/proxy node 210 can track and analyze database usage, query performance, and resource utilization. Driver/proxy node 210 can capture and log query statistics, server health metrics, and other relevant information for troubleshooting, performance tuning, or auditing purposes.

In some implementations, an example operating process of hybrid database 200 starts when driver/proxy node 210 receives a database request from client 212. Driver/proxy node 210 can distribute the incoming requests across multiple servers, for example, servers 202a and 202b, to ensure load balancing and optimal resource utilization. Once the request is assigned to a server, a SQL engine, for example, SQL engine 204a or 204b, on that server receives and processes the request. In some examples, the SQL engine parses and validates the SQL query, creates an execution plan, and initiates the query execution process. The transaction engines, for example, transactions engines 206a or 206b, can work alongside the SQL engine and manage the transactions associated with the request. In some examples, the transaction engines can interact with the storage engines, for example, storage engines 208a and 208b, to access and manipulate data stored within hybrid database 200. The storage engines can handle data storage format, read and write operations, indexing, caching, and durability. The storage engines can retrieve, and update required data based on instructions from the transaction engines. After the transaction engines finalize the transactions and the SQL engines complete query execution, the SQL engines can complete the results and send the results back to client 212 through driver/proxy node 210.

In some implementations, hybrid database 200 is a stand-alone and distributed integrated database that can dynamically switch between a stand-alone mode and a distributed mode. Hybrid database 200 can include independent SQL engines, transaction engines, and storage engines in both the stand-alone mode and the distributed mode. This enables dynamic configuration switching by client and can allow the database and the underlying system to operate efficiently without incurring the distributed interaction overhead in the stand-alone mode.

In some examples, when hybrid database 200 operates in the distributed mode, data can be replicated or distribute across multiple servers, for example, servers 202a and 202b. Storage engines 208a and 208b can ensure data consistency and availability by replacing or distributing the data across appropriated server, which allows for improved performance, fault tolerance, and data redundancy. In some examples, inter-server communication can occur during the query execution and transaction processing. Servers can exchange data, transactional updates, and coordination information to maintain consistency and synchronization across the database. This communication ensures that the transactional changes are propagated to the relevant servers and maintained in a consistent state. In some implementations, the components in different servers communicate by using RPCs. In some examples, RPCs can allow an application running on one database server to invoke procedures or functions on a remote database server as if they were local. RPCs can enable the application to execute database operations or trigger specific actions on the remote database server without being aware of the underlying network communication details. One example RPC can include sending a request by a client application running on a server to execute a procedure, which is marshalled, transmitted over the network, for example, network 214, and executed on the remote server. The result is then returned to the client application for further processing. RPCs facilitate distributed computing and seamless interaction with remote databases.

In some examples, when hybrid database 200 operates in the stand-alone mode, components, for example, SQL engine 204a, transaction engines 206a, and storage engine 208a, within a same database server, for example, server 202a, can communicate with each other using function calls within a same process. Each one of the components can expose a set of functions or methods that define its operations and functionality. These functions can be defined with specific parameters and return types. In some examples, to communicate and collaborate, one component invokes the functions provided by another component. The invoking component passes any required parameters to the function during the function call. The called function executes within the same process and performs its specific functionality, which can involve accessing or modifying data, processing queries, managing transactions, or other database-related tasks. The function can also return a result or value back to the calling component. IN some examples, components can synchronize their operations or coordinate their activities to ensure data consistency and integrity. This can be achieved through mechanisms such as locks, semaphores, or shared data structures within the same process. If an error occurs during the execution of a function, the appropriate error handling mechanisms can be employed. Error codes, exceptions, or other error handling techniques can be used to propagate and handle errors within the components. By utilizing function calls within the same process, components within a same database server can communicate efficiently and exchange information. The function calls provide a direct and controlled means for components to interact and collaborate, enabling the database system to execute its various operations and fulfill its functionality.

Therefore, when hybrid database 200 operates in the stand-alone mode, it can provide the same efficiency and performance while using a stand-alone database. When hybrid database 200 operates in the distributed mode, there is no additional costs for its operations at the SQL layer, the transaction layer, and the storage layer. Thus, the stand-alone and distributed adaptive architecture of hybrid database 200 can allow for dynamical switching between the stand-alone mode and the distributed mode, thereby mitigating potential data migration and the maintenance costs associated with switching databases.

Figure 3:
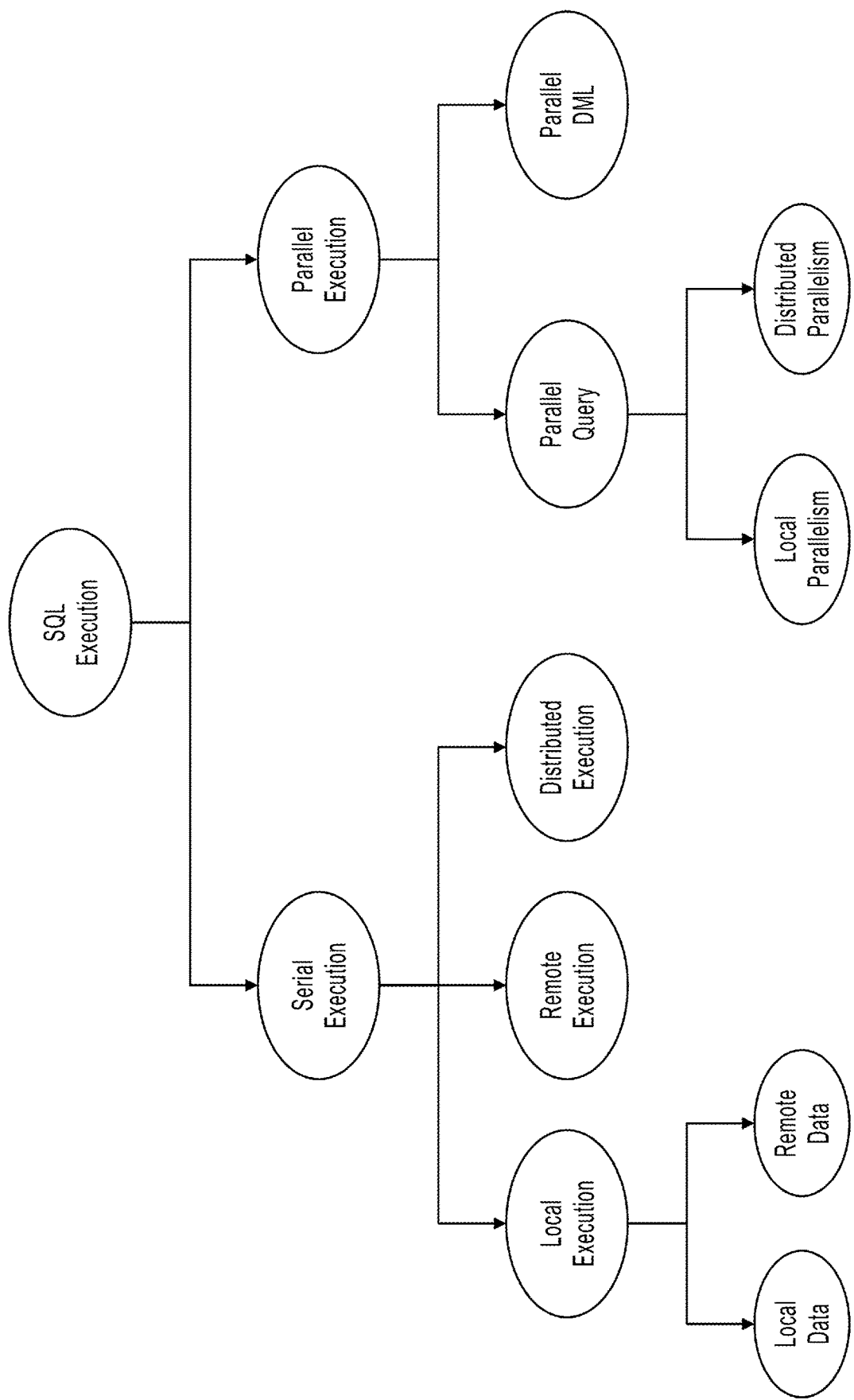
FIG. 3 shows a granular diagram of example SQL execution, in accordance with some implementations of the present disclosure.

FIG. 3 shows a granular diagram of example SQL execution, in accordance with some implementations of the present disclosure. The example SQL execution in FIG. 3 can be performed by any suitable device disclosed herein, such as one or more of SQL engines 103a, 103b, 118, 204a and 204b. In general, each SQL execution can be performed in one of two modes: serial execution or parallel execution. As shown, serial execution includes local, remote, and distributed execution. Parallel execution includes parallel queries and DML operations that improve the performance.

In terms of increasing parallelism, SQL execution can be gradually divided into serial execution, single-machine parallel execution, and distributed parallel execution. In the integrated stand-alone and distributed architecture, the SQL engines can adaptively switch between these modes.

In some implementations, during serial execution of SQL statements, if the relevant tables or partitions are located on the local machine, local execution of the SQL statements in the stand-alone mode by using local data can be the same as execution of the SQL statement in a native mode. If all or a part of the relevant tables or partitions are not located on the local machine but are located in a remote node instead, execution of the SQL statement can be performed using two methods: local execution, by using data pulled through remote data acquisition service, or remote execution where the entire transaction processing and storage access are forwarded to the remote node, acting as a proxy, and then returned directly.

In some implementations, if the data involved in a single SQL query is distributed across multiple nodes, the calculation can be pushed down to each node. To ensure efficient serial execution, the SQL engines can process the SQL query in a distributed execution mode, similar to a distribute-gather method in a Map-Reduce model. In some examples, the SQL engines can decompose a SQL query into subqueries or tasks that can be processed independently, where each subquery operates on a subset of the data. For each subquery, the SQL engines can generate a corresponding map function that operates on a subset of the data, and use the map function to extract and transform the relevant data required for the query. The SQL engines can then group the intermediate results produced by the map functions and sort them based on a key. Next, the SQL engines can perform aggregations and computations on the shuffled and sorted intermediate data to produce the final result, for example, by using reduce functions to apply operations such as aggregations, filtering, and transformation. Once the reduce phase is complete, the SQL engines can combine the result from the reduce functions and return the final result. In some implementations, the parallelism of each node can be limited to 1, allowing each node to efficiently execute in a serial manner without context switching or remote data access. This approach can be particularly suitable for small and medium-sized enterprises, as efficient data querying can be achieved without complex parallel mechanisms in small-scale operations.

In some implementations, an adaptive selection strategy is used for serial execution by selecting an execution method between direct access store (DAS) execution and distributed execution. One implementation of DAS is to directly pull data from remote nodes, which is suitable for simple point queries or index access back to the table queries that are remotely located. However, in distributed environments, pushing down calculations by using distributed execution can be more efficient than data pulling because it does not require additional computational resources. For specific queries or scenarios involving massive data scanning, the database can dynamically select an optimal strategy between the two, depending on which strategy offers a more favorable execution cost.

For large-scale data queries, higher parallelism can be required, and this can be achieved by introducing parallel capabilities to enhance SQL processing capacity and reduce response times. In some implementations, parallel execution includes parallel query and parallel data manipulation language (DML).

Parallel query is a method used to increase the execution speed of SQL queries by creating multiple query processes that divide the workload of a SQL statement and executing it in parallel or at the same time. In some examples, the SQL engine can divide the SQL query into smaller units of work, such as partitions or segments, based on the available data and parallelism settings. Each unit is assigned to a separate processor or thread for concurrent processing. The data involved in the query is distributed across the available processors or threads. This distribution can be based on various strategies, including data partitioning, where different portions of the data are allocated to different execution units. Each processor or thread independently processes its assigned data subset simultaneously. They perform operations such as scanning, filtering, joining, or aggregating the data in parallel, utilizing the available processing resources effectively. During the execution, the parallel processes may need to communicate and exchange intermediate results or perform coordination tasks. Inter-process communication mechanisms, such as shared memory or message passing, are used to facilitate data exchange and synchronization among the parallel execution units. Once the individual parallel processes complete their tasks, the intermediate results are combined or merged to generate a final result set. This consolidation step ensures that the overall query result is consistent and complete.

In some implementations, the parallel execution framework as described herein is adaptable to handle both parallelism within a stand-alone manner (that is, local parallelism) and distributed manner (that is, distributed parallelism). In some examples, local parallelism refers to parallel execution within a single machine or node. In this approach, a query is divided into smaller tasks or sub-operations, and these tasks are executed concurrently by multiple processors or threads within the same machine. Each processor or thread works on a subset of the data, processing it in parallel. The results from each parallel task are combined to produce the final query result.

Local parallelism can be beneficial when dealing with large datasets or complex queries. It allows for better utilization of the available processing resources within a single machine, such as multi-core CPUs. By dividing the workload and executing tasks in parallel, local parallelism improves query performance and response times.

In some examples, distributed parallelism involves parallel execution across multiple machines or nodes in a distributed computing environment. In this approach, a query is distributed among multiple processors or nodes, each responsible for processing a portion of the data. The processors or nodes work concurrently to execute their respective parts of the query, and the results are merged or combined to produce the final query result.

Distributed parallelism can offer the advantage of leveraging the combined processing power and resources of multiple machines or nodes. It enables efficient handling of large-scale data processing and enables horizontal scalability. By distributing the workload across multiple machines, distributed parallelism can handle high-volume data queries, complex analytics, and support real-time or near-real-time processing.

The choice between local parallelism and distributed parallelism can depend on the specific requirements, data scale, and available resources. Local parallelism is suitable when the data can be effectively processed within a single machine or node, whereas distributed parallelism is more appropriate for scenarios requiring high scalability, large-scale data processing, and distributed computing environments.

Parallel DML refers to the execution of DML operations in parallel across multiple processors or threads to enhance the performance and efficiency of data manipulation tasks. In some examples, DML operations include actions such as inserting, updating, deleting, or querying data in a database.

In a parallel DML execution, the workload of processing the DML operations is distributed among multiple processors or threads, allowing them to work simultaneously on different subsets of the data. This parallel processing approach can significantly speed up the execution of DML statements, especially when dealing with large datasets or complex queries. In some examples, not all DML operations can be parallelized. The parallel execution of DML statements can depend on factors such as the database system, the nature of the DML operation, data dependencies, and the availability of resources.

Figure 4:
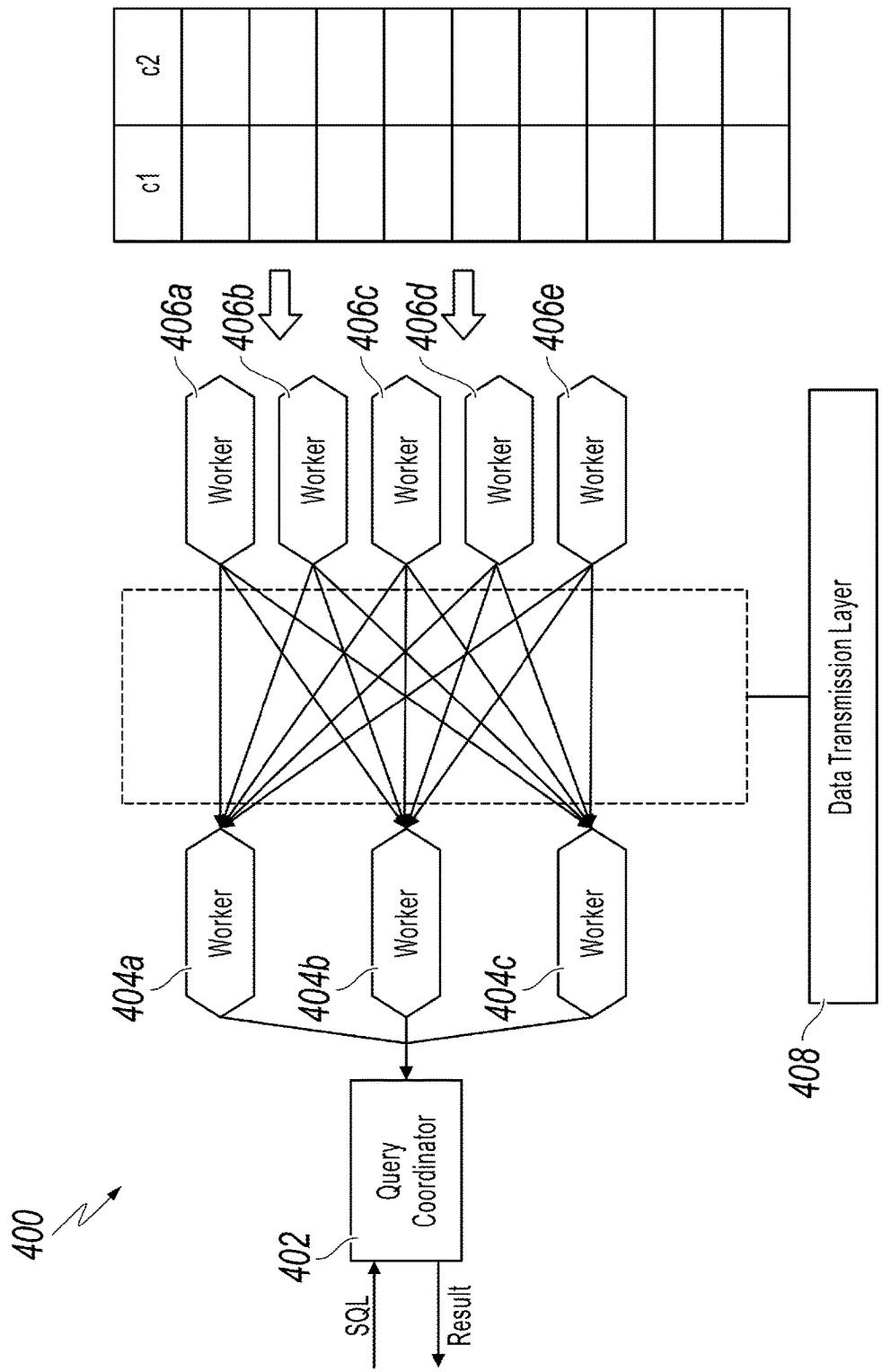
FIG. 4 shows a schematic diagram of an example SQL engine, according to some implementations.

FIG. 4 shows a schematic diagram of an example SQL engine 400, in accordance with some implementations of the present disclosure. In some implementations, SQL engine 400 is an example of any one of SQL engines 103a, 103b, 118, 204a, or 204b. As shown, SQL engine 400 includes query coordinator 402, workers 404a-c and 406a-e, and data transmission layer 408. Note that SQL engine 400 is shown to include eight workers for illustrative purposes only. In some implementations, SQL engine 400 includes any suitable number of workers.

In some implementations, query coordinator 402 is configured to coordinate and manage the execution of a query. Query coordinator 402 can act as the central control point for query processing and the communication hub, coordinating the activities of workers, managing resources, optimizing execution plans, and delivering the final result.

In some implementations, query coordinator 402 is configured to perform query parsing and analysis. For example, query coordinator 402 can receive the incoming SQL query and parse it to understand its structure and semantics. Query coordinator 402 can perform initial analysis, such as checking the query syntax, validating access permissions, and ensuring query consistency.

In some implementations, query coordinator 402 is configured to perform query optimization. For example, query coordinator 402 can determine a most efficient query execution plan by optimizing the query. Query coordinator 402 can generate an optimal plan for data retrieval and processing based on various factors, such as available indexes, statistics, cost estimations, and system resources.

In some implementations, query coordinator 402 is configured to perform resource allocation. For example, query coordinator 402 can allocate necessary resources for query execution, such as memory, disk space, and CPU resources. Query coordinator 402 can determine the system's overall workload and available resources to ensure fair distribution and avoid resource contention among concurrent queries.

In some implementations, query coordinator 402 is configured to perform task distribution. For example, query coordinator 402 can, based on the chosen query execution plan, assign subtasks or portions of the query to individual workers or processing units. Query coordinator 402 can divide the workload among multiple workers to enable parallel processing, assigning specific data partitions or operations to each worker.

In some implementations, query coordinator 402 is configured to perform task synchronization and monitoring. For example, query coordinator 402 can monitor the progress of query execution by receiving periodic updates from workers. Query coordinator 402 can ensure that all subtasks are executing correctly, monitors resource usage, and handles any exceptions or errors that occur during execution. Query coordinator 402 can also synchronize the completion of subtasks and manages dependencies between them.

In some implementations, query coordinator 402 is configured to perform result aggregation. For example, as workers complete their subtasks and produce intermediate results, query coordinator 402 can collect and combine these results to generate the final output of the query. Query coordinator 402 can ensure the correct merging of partial results and guarantee the consistency and completeness of the query result.

SQL engine 400 further includes workers 404a-c and 406a-c. In some implementations, each one of workers 404a-c and 406a-e is a computational unit for executing queries or performing data processing tasks. In some example, workers 404a-c and 406a-e can handle the execution of SQL statements and perform the necessary operations to retrieve, manipulate, or analyze data.

In some implementations, the number of workers in SQL engine 400 can vary depending on the specific implementation and the available system resources. Each worker can be assigned a portion of the query workload or data partitions to process in parallel, allowing for efficient execution and improved performance.

In some implementations, workers in SQL engine 400 are configured to perform query parsing. For example, workers 404a-c can receive SQL queries and parse them into a structured representation for further processing.

In some implementations, workers in SQL engine 400 are configured to perform data retrieval and processing. For example, workers 406a-e can retrieve data from storage systems, perform any necessary joins, aggregations, or transformations, and apply the specified filters or conditions.

In some implementations, workers in SQL engine 400 are configured to perform parallel execution. For example, workers 404a-c and 406a-e can operate concurrently to process their assigned portions of the data or query tasks. This parallelism allows for faster and more efficient data processing, especially when dealing with large datasets or complex queries.

In some implementations, workers in SQL engine 400 are configured to perform intermediate result exchange. For example, workers 404a-c can exchange intermediate results or coordinate their operations with workers 406a-c. Communication mechanisms, such as message passing or shared memory, can be used to facilitate the exchange of data and synchronization among workers.

In some implementations, workers in SQL engine 400 are configured to perform result consolidation. For example, workers 404a-c can combine their individual results to generate the final output of the SQL query. This consolidation step can ensure that the query result is complete and consistent across all processed data.

In some implementations, the number and configuration of workers in SQL engine 400 can be tuned based on the system's resources, query workload, and desired performance. In some examples, increasing the number of workers can enhance parallelism and improve query processing speed, but it also requires sufficient computational resources and careful system optimization to avoid resource contention or performance degradation.

SQL engine 400 further includes data transmission layer 408. In some implementations, data transmission layer 408 is configured to facilitate the exchange of data and information between workers during query processing. By providing a reliable and efficient communication infrastructure, data transmission layer 408 can enable workers to collaborate effectively, exchange data, and synchronize their operations during parallel query execution.

In some implementations, data transmission layer 408 is configured to facilitate data exchange. For example, data transmission layer 408 can enable workers to exchange intermediate results, query plans, metadata, and other relevant information required for query execution. Data transmission layer 408 can facilitate the transfer of data between different stages of query processing, such as during data retrieval, join operations, or aggregation tasks.

In some implementations, data transmission layer 408 is configured to facilitate synchronization. For example, data transmission layer 408 can ensure proper synchronization between workers to maintain data consistency and avoid conflicts. Data transmission layer 408 can provide mechanisms for coordinating parallel operations, such as synchronization points or barriers, to ensure that all workers progress together and share consistent data views.

In some implementations, data transmission layer 408 is configured to perform message passing. For example, data transmission layer 408 can enable workers to communicate with each other by passing messages. Data transmission layer 408 can allow workers to send and receive messages containing instructions, data subsets, status updates, or other relevant information.

In some implementations, data transmission layer 408 is configured to provide distributed computing support. For example, in distributed environments, where SQL engines span across multiple machines or nodes, data transmission layer 408 can facilitate communication between workers located on different machines. Data transmission layer 408 can handle the complexities of network communication, addressing, and routing to enable seamless data exchange and coordination across distributed systems.

In some implementations, data transmission layer 408 is configured to provide performance optimization. For example, data transmission layer 408 can be configured to optimize the performance of inter-worker communication. Data transmission layer 408 can employ various techniques such as data compression, serialization/deserialization optimizations, and efficient network protocols to minimize latency, reduce data transfer overhead, and enhance overall query execution speed.

In some implementations, data transmission layer 408 is configured to dynamically perform communication. In some examples, for local parallelism, data transmission layer 408 can automatically facilitate data interaction between threads through memory copies and can utilize network communication only when necessary.

Figure 5:
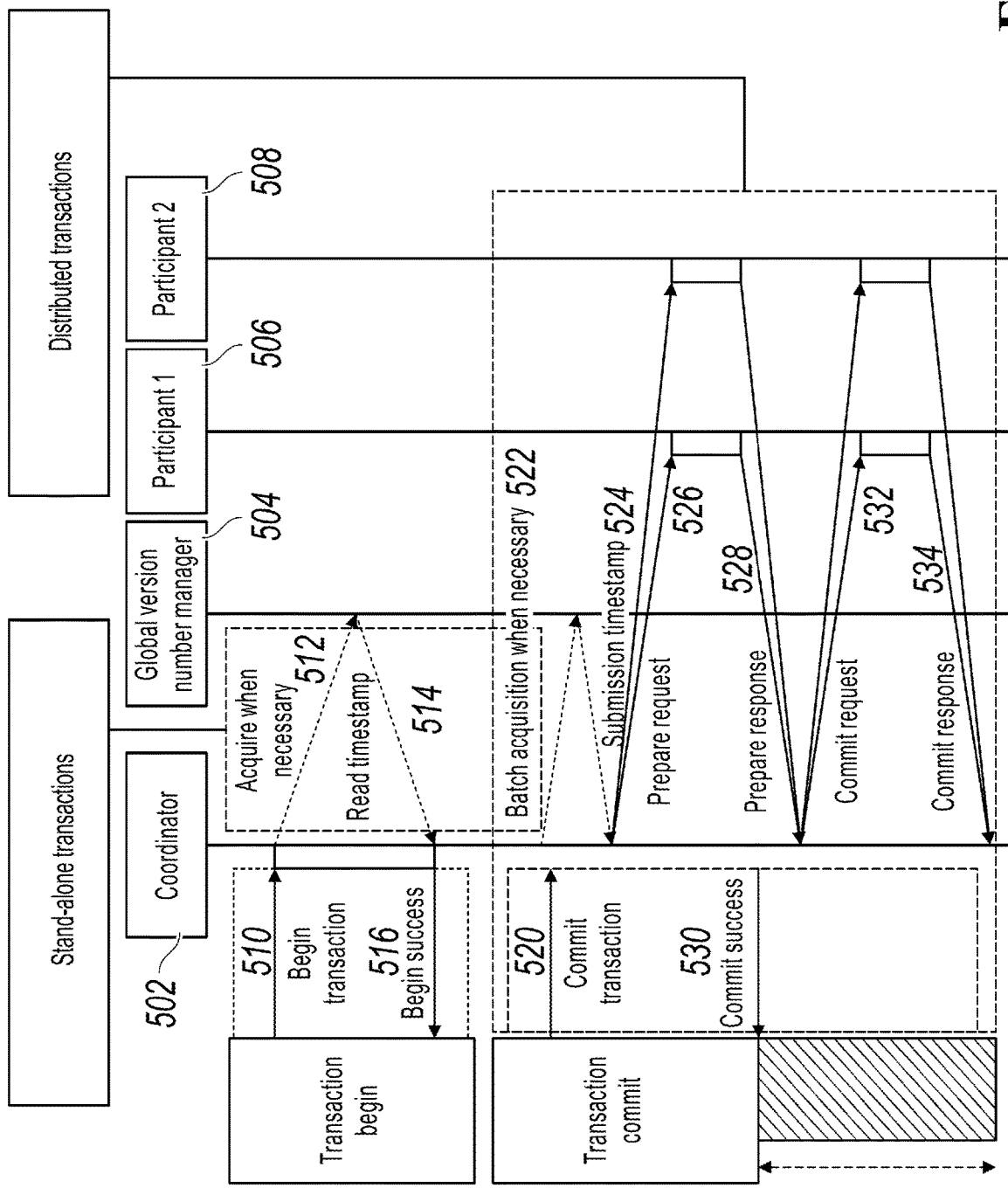
FIG. 5 shows a diagram of an example process of transaction processing, in accordance with some implementations of the present disclosure.

FIG. 5 shows a diagram of an example process 500 of transaction processing, in accordance with some implementations of the present disclosure. Process 500 can be performed by any suitable device disclosed herein, such as one or more of servers 202a-b or transaction engines 206a-b. The operations shown in process 500 may not be exhaustive and, in some examples, other operations can be performed before, after, or in between any of the illustrated operations. Further, some of the operations may be performed simultaneously, or in a different order than shown in FIG. 5.

At the outset, a two-phase commit (2PC) protocol can be used for transaction processing. The 2PC protocol divides the transaction commit process into two phases: the prepare phase and the commit phase. The 2PC protocol involves a coordinator, which is typically a central authority responsible for coordinating the commit or rollback of a distributed transaction, and multiple participants (also known as cohorts) that are involved in the transaction.

In the prepare phase of the 2PC protocol, the coordinator sends a prepare request to all participants, asking them to prepare for committing the transaction. Each participant receives the prepare request and performs necessary validation and resource locking to ensure the transaction can be successfully committed. After preparing, each participant responds to the coordinator with either a "yes" vote, indicating it is ready to commit, or a "no" vote, indicating it cannot commit due to some error or constraint violation.

In the commit phase of the 2PC protocol, based on the participants' responses, the coordinator determines whether all participants voted "yes" to commit or if any participant voted "no." If all participants voted "yes," the coordinator sends a commit request to all participants. Upon receiving the commit request, each participant applies the changes of the transaction permanently and releases any locks or resources held. Finally, each participant responds to the coordinator with an acknowledgment of the commit operation.

If any participant votes "no" during the prepare phase or if the coordinator fails to receive responses from all participants, the coordinator initiates an abort or rollback operation. In this case, the coordinator sends a rollback request to all participants, and each participant undoes any changes made by the transaction and releases any acquired resources.

The purpose of the 2PC process is to ensure that all participants in a distributed transaction agree on whether to commit or rollback, thereby maintaining data consistency across multiple systems. It guarantees that either all participants commit the transaction, or all participants roll it back, preventing inconsistencies or partial completion of the transaction across the distributed environment.

However, using the above-described 2PC protocol to handle transactions in a stand-alone machine can expose sub-optimal performance in certain scenarios. For example, distributed transaction engines can have additional coordination components internally, which can cause unnecessary delays and overhead when submitting transactions in a distributed database.

In some implementations, process 500 can be performed in both stand-alone and distributed scenarios. In some examples, transaction processing in the stand-alone scenarios can include a one-phase processing. In some examples, transaction processing in the distributed scenarios can include a modified 2PC processing.

In some examples, the one-phase transaction processing in the stand-alone mode includes starting the transaction, performing data manipulation operations such as retrieval, insertion, modification, or deletion on the database. Concurrency control mechanisms are employed to manage concurrent access and maintain data consistency. Validation and integrity checks are conducted to ensure data validity against defined constraints and rules. At the end of the transaction, a decision is made whether to commit the changes, making them permanent, or rollback the transaction, undoing the changes. The transaction concludes with a commit or rollback statement, finalizing the transaction process.

In some implementations, if a single transaction involves a single log stream and the volume of data falls within a tolerable granularity for load balancing, and when the database is deployed in a stand-alone manner, there is a high probability that maintaining a single log stream is sufficient. In this case, transactions submitted within this single log stream do not require a 2PC protocol. Instead, processing of such transactions is similar to that of a typical stand-alone database. After the transaction data and status are written to the local log and persisted, the transaction is considered successfully committed.

In some implementations, the database uses the transaction version numbers to identify the order of committed transactions. In such implementations, the database can be configured to use the local timestamp service to obtain the transaction version number, and obtain the version number through a function call, thereby avoiding the overhead of context switching caused by RPC. In a distributed scenario, the database can obtain the transaction version number through the global timestamp service.

As shown, for stand-alone transactions (that is, transactions associated with a single log stream), processing of the transactions begins when coordinator 502 receives an instruction to begin a transaction (510). In some examples, when the database uses the local timestamp service to obtain the transaction version number, operations 512 and 514 can be omitted. In the transaction begin phase, coordinator 502 can be configured to coordinate and manage the initiation of the transaction.

In some implementations, coordinator 502 is configured to perform transaction identification (ID) assignment. For example, coordinator 502 can assign a unique identifier or transaction ID to the newly initiated transaction. The transaction ID can be used to distinguish the transaction from others and track its progress.

In some implementations, coordinator 502 is configured to perform resource allocation. For example, coordinator 502 can ensure the availability and allocation of necessary resources required by the transaction, by performing operations including, for example, acquiring locks, allocating memory, or reserving other resources needed for the transaction's execution.

In some implementations, coordinator 502 is configured to perform transaction context setup. For example, coordinator 502 can set up the transaction context, which includes establishing the isolation level for the transaction and initializing any relevant settings or variables associated with the transaction's execution.

In some implementations, coordinator 502 is configured to perform notification and coordination. For example, coordinator 502 can notify relevant participants or subsystems within the database about the initiation of the transaction. This allows other participants, such as resource managers or databases, to be aware of the ongoing transaction and prepare for their involvement.

In some implementations, coordinator 502 is configured to facilitate logging and recovery setup. For example, coordinator 502 can ensure that appropriate logging and recovery mechanisms are in place for the transaction. Coordinator 502 can perform operations including, for example, initializing the transaction log and establishing the necessary protocols for recording transactional changes and ensuring durability and recovery capabilities.

In some implementations, coordinator 502 is configured to use the local timestamp service to obtain the transaction version number, and obtain the version number through a function call, thereby avoiding the overhead of context switching caused by RPC.

In some implementations, coordinator 502 is configured to monitor and verify the successful completion of necessary steps during the begin phase of the transaction. If all the necessary operations are executed successfully and the required resources are acquired, coordinator 502 can consider the begin phase of the transaction to be successful (516). In some examples, after the transaction data and their status information are written to a local log and persisted, the transaction is considered successfully committed.

In some examples, coordinator 502 can acquire the version numbers from global version number manager 504 when necessary (512). The interaction between coordinator 502 and global version number manager 504 in a database involves coordinating and managing the assignment and tracking of global version numbers for transactions. In some implementations, global version number manager 504 is configured to generate and manage unique version numbers that can be used to track and manage the state of data items within the database.

In some implementations, global version number manager 504 is configured to assign a unique version number to the transaction. This version number represents the state of the database at the time the transaction begins. During the execution of the transaction, coordinator 502 can request additional version numbers from global version number manager 504 as needed, for example, when the transaction reads or writes data items to ensure proper visibility and consistency. Before committing the transaction, coordinator 502 may verify that the version numbers used by the transaction are still valid. This helps ensure that the transaction's view of the database has not become outdated due to concurrent updates from other transactions.

Global version number manager 504 returns the version numbers as well as relevant timestamps to coordinator 502 (514). After receiving the version numbers, coordinator 502 can validate the consistency of data access, detect and resolve conflicts, and enforce transaction serialization by using the version numbers. For example, coordinator 502 can check if the version numbers of the data items accessed by the transaction are compatible with the transaction's start timestamp. It helps to prevent dirty reads, non-repeatable reads, and other data inconsistency issues.

In some examples, coordinator 502 can use the version numbers to detect conflicts between transactions. By comparing version numbers and timestamps, coordinator 502 can identify cases where multiple transactions are accessing or modifying the same data concurrently. Coordinator 502 can then apply conflict resolution mechanisms, such as locking or optimistic concurrency control, to manage and resolve these conflicts.

In some examples, coordinator 502 can use the version numbers to determine the order of transaction execution, for example, when enforcing serializability. By comparing version numbers and timestamps, coordinator 502 can ensure that transactions are executed in a serializable order, maintaining data consistency and avoiding conflicts.

In some implementations, for a distributed transaction that involves multiple independent resources or databases that are geographically distributed or managed by separate systems, the transaction is considered successfully committed once the prepare phase of the 2PC protocol is completed. As shown in FIG. 5, coordinator 502 receives an instruction to commit a transaction (520). In some examples, coordinator 502 can request version numbers from global version number manager 504 when necessary (522). Global version number manager 504 can return version numbers as well as relevant timestamps to coordinator 502 (524).

In the prepare phase, coordinator 502 sends a prepare request to all participants, for example, participants 506 and 508, asking them to prepare for committing the transaction (526). Each participant receives the prepare request and performs necessary validation and resource locking to ensure the transaction can be successfully committed. After preparing, each participant responds to the coordinator (528) with either a "yes" vote, indicating it is ready to commit, or a "no" vote, indicating it cannot commit due to some error or constraint violation.

In some implementations, once the prepare phase is completed, the transaction state can be set to committed when all participants indicating they are ready to commit, and coordinator 502 can indicate the transaction has been successfully committed (530). At this point, the transaction is considered committed and can be returned.

In some examples, after indicating to client that the transaction has been successfully committed after the prepare phase, coordinator 502 can proceed to the commit phase, and sends commit request to all participants (532). Upon receiving the commit request, each participant can apply the changes of the transaction permanently and release any locks or resources held. Finally, each participant responds to the coordinator with an acknowledgment of the commit operation (534).

In some implementations, the coordinator's state is not logged in the prepare phase and the commit phase. In exceptional cases, the coordinator's state can be recovered based on transaction logs of the participants. The coordinator's state, including its transactional metadata, context, and resource allocations, can be reconstructed based on the transaction logs and the recovered state of the participating nodes or databases. This allows the coordinator to resume its operation and continue processing the remaining transactions. In some cases, depending on the nature of the exceptional event and the level of consistency required, the database system may need to re-execute certain transactions that were affected by the failure. This ensures that the transactions are correctly completed, and the database remains in a consistent state. In some examples, the database system can analyze the transaction logs to identify the incomplete or in-progress transactions at the time of the exceptional event. The incomplete transactions that were active during the exceptional event need to be rolled back to their previous consistent state. The database system uses the transaction logs to undo the changes made by these transactions and restore the data to their pre-transaction state. Once the rollback is complete, the database system redoes the committed transactions' operations that were not yet reflected in the permanent storage due to the exceptional event.

Process 500 can be used by an integrated transaction processing engine to adaptively process both stand-alone and distributed transactions. For single-log-stream transactions, the database employs a local timestamp service instead of a global one to maintain global consistency. This reduces the reliance on global timestamp services, resulting in improved efficiency and resource allocation by invoking them only when required. Additionally, since the coordinator's state is not logged, the database experiences fewer messages and reduced log writes during the transaction submission to successful commit phase. This optimization enhances the management of extensive log streams in a distributed database.

Figure 6:
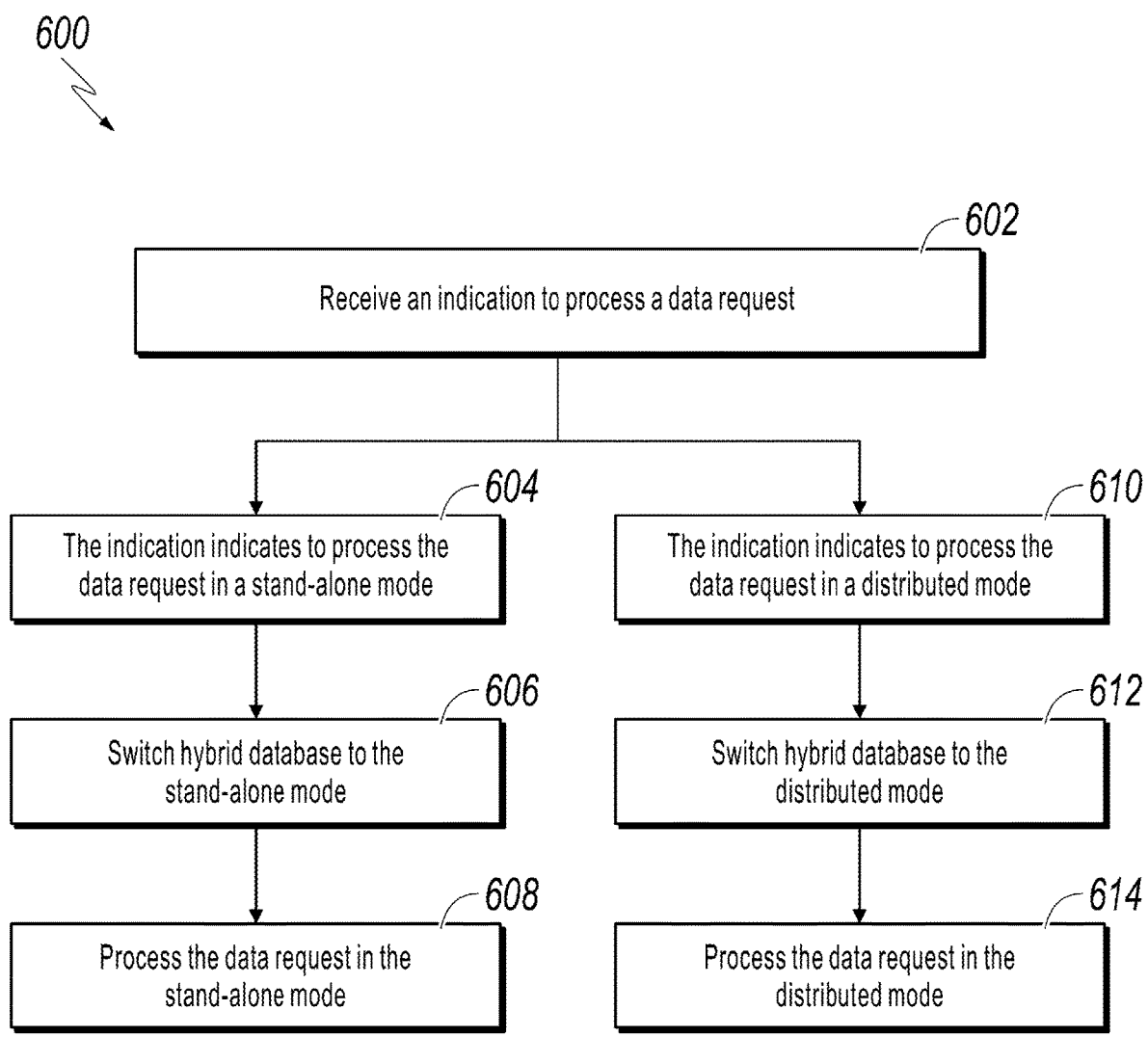
FIG. 6 shows a flowchart of an example process for hybrid database implementation, in accordance with some implementations of the present disclosure.

FIG. 6 shows a flowchart of an example process 600 for hybrid database implementation, in accordance with some implementations of the present disclosure. Process 600 can be performed by any suitable device disclosed herein, such as hybrid database 200. Accordingly, the following description of process 600 is provided with respect to hybrid database 200. In some implementations, some or all of the operations in process 600 are implemented based on the techniques described in connection with FIGS. 1-5. The operations shown in process 600 may not be exhaustive and that other operations can be performed as well before, after, or in between any of the illustrated operations. Further, some of the operations may be performed simultaneously, or in a different order than shown in FIG. 6.

Process 600 starts when a system, for example, database 200, receives an indication to process a data request (602). In some implementations, the system is configured as a hybrid database to dynamically switch between a stand-alone mode and a distributed mode.

In some implementations, the system includes a number of computer nodes, for example, servers 202a and 202b, and each computer node includes a SQL engine, for example, 204a or 204b, a transaction engine, for example, 206a or 206b, and a storage engine, for example, 208a or 208b.

In some implementations, the hybrid database includes SQL layer, for example, 204, a transaction layer, for example, 206, and a storage layer, for example, 208. The SQL layer includes the SQL engines in the computer nodes, the transaction layer includes the transaction engines in the computer nodes, and the storage layer includes the storage engines in the computer nodes.

In some implementations, the data request is a SQL query. In some examples, a SQL query is a command or statement that is used to retrieve, manipulate, or manage data in a database management system. A SQL query allows users to interact with the database by performing operations such as data retrieval, insertion, deletion, and modification. In some examples, a SQL query includes keywords, expressions, and clauses that define the desired operation on the database. An example of a SQL query is the SELECT statement, which is used to retrieve data from one or more database tables based on specified conditions. Other examples of SQL queries include INSERT, UPDATE, and DELETE statements, which are used to add, modify, or delete data in the database.

In some examples, a SQL query can involve various clauses such as WHERE, JOIN, GROUP BY, HAVING, ORDER BY, and LIMIT, which provide additional filtering, sorting, and grouping functionalities to refine the query results.

In some implementations, the data request is a transaction request. In some examples, a transaction request a specific operation or set of operations that are grouped together as a single logical unit. A transaction request can represent a user's or application's intent to perform a series of database actions atomically, meaning that either all the actions within the transaction should succeed and be permanently saved, or none of them should take effect.

In some examples, a transaction request includes one or more database operations such as data retrieval, insertion, modification, or deletion. These operations are executed as a cohesive unit, ensuring the integrity and consistency of the data.

In some examples, a transaction request can include a transaction identifier or context that uniquely identifies the transaction. The transaction request can specify the actions to be performed, the data involved, and any conditions or constraints that need to be satisfied for the transaction to proceed.

When the indication indicates to the system to process the data request in the stand-alone mode (604), the system switches the hybrid database to the stand-alone mode (606) and processes the data request in the stand-alone mode (608).

In some examples, the indication indicates the stand-alone mode. In some examples, the indication includes an instruction instructing the system to switch to the stand-alone mode. In some examples, the indication indicates that the data request is a stand-alone type of data request.

In some examples, switching the system to the stand-alone mode can be achieved by adjusting configuration options in a database management system of the hybrid database. Configuration files or settings can be modified to enable or disable stand-alone features, based on the indication. In some examples, switching the system to the stand-alone mode can include removing or disabling nodes from the system, disabling node replication and distributed query processing, and changing the partitioning scheme or redistributing the data across nodes.

In some implementations, the system processes the data request using a single-process-multiple thread model in the stand-alone mode. In some examples, in the single-process-multiple thread model, a single process creates and manages multiple threads of execution within its own address space. The process can act as a container for multiple threads that can concurrently execute different tasks or operations. The process can have its own memory space, including code, data, and resources. Each thread within the process has its own stack and program counter, but they share the same memory space, file descriptors, and other process-related resources.

The single-process-multiple thread model can provide improved concurrency, as multiple threads can execute tasks in parallel, and efficient resource utilization, as threads can share data and resources within the same process without the need for inter-process communication.

In some implementations, a particular node of the system processes the data request using one or more function calls in the stand-alone mode.

In some examples, components located within a same database server can communicate with each other using function calls within a same process. Each one of the components can expose a set of functions or methods that define its operations and functionality. To communicate and collaborate, one component can invoke the functions provided by another component. The invoking component can pass any required parameters to the function during the function call. The called function executes within the same process and performs its specific functionality, which can involve accessing or modifying data, processing queries, managing transactions, or other database-related tasks. The function can also return a result or value back to the calling component. By utilizing function calls within the same process, components within a same database server can communicate efficiently and exchange information. The function calls provide a direct and controlled means for components to interact and collaborate, enabling the database system to execute its various operations and fulfill its functionality.

When the indication indicates to the system to process the data request in the distributed mode (610), the system switches the hybrid database to the distributed mode (612) and processes the data request in the distributed mode (614).

In some examples, the indication indicates the distributed mode. In some examples, the indication includes an instruction instructing the system to switch to the distributed mode. In some examples, the indication indicates that the data request is a distributed type of data request.

In some examples, switching the system to the distributed mode can be achieved by adjusting configuration options in a database management system of the hybrid database. Configuration files or settings can be modified to enable or disable distributed features, such as distributed transaction processing, data partitioning, or replication, based on the indication. In some examples, switching the system to the distributed mode can include adding or enabling nodes in the system, enabling node replication and distributed query processing, and changing the partitioning scheme or redistributing the data across nodes.

In some implementations, multiple computer nodes of the system process the data request using one or more RPCs. In some examples, the components in different database servers can communicate by using RPCs. In some examples, RPCs can allow an application running on one database server to invoke procedures or functions on a remote database server as if they were local. RPCs can enable the application to execute database operations or trigger specific actions on the remote database server without being aware of the underlying network communication details. One example RPC can include sending a request by a client application running on a server to execute a procedure, which is marshalled, transmitted over the network, and executed on the remote server. The result is then returned to the client application for further processing. RPCs facilitate distributed computing and seamless interaction with remote databases.

Figure 7:
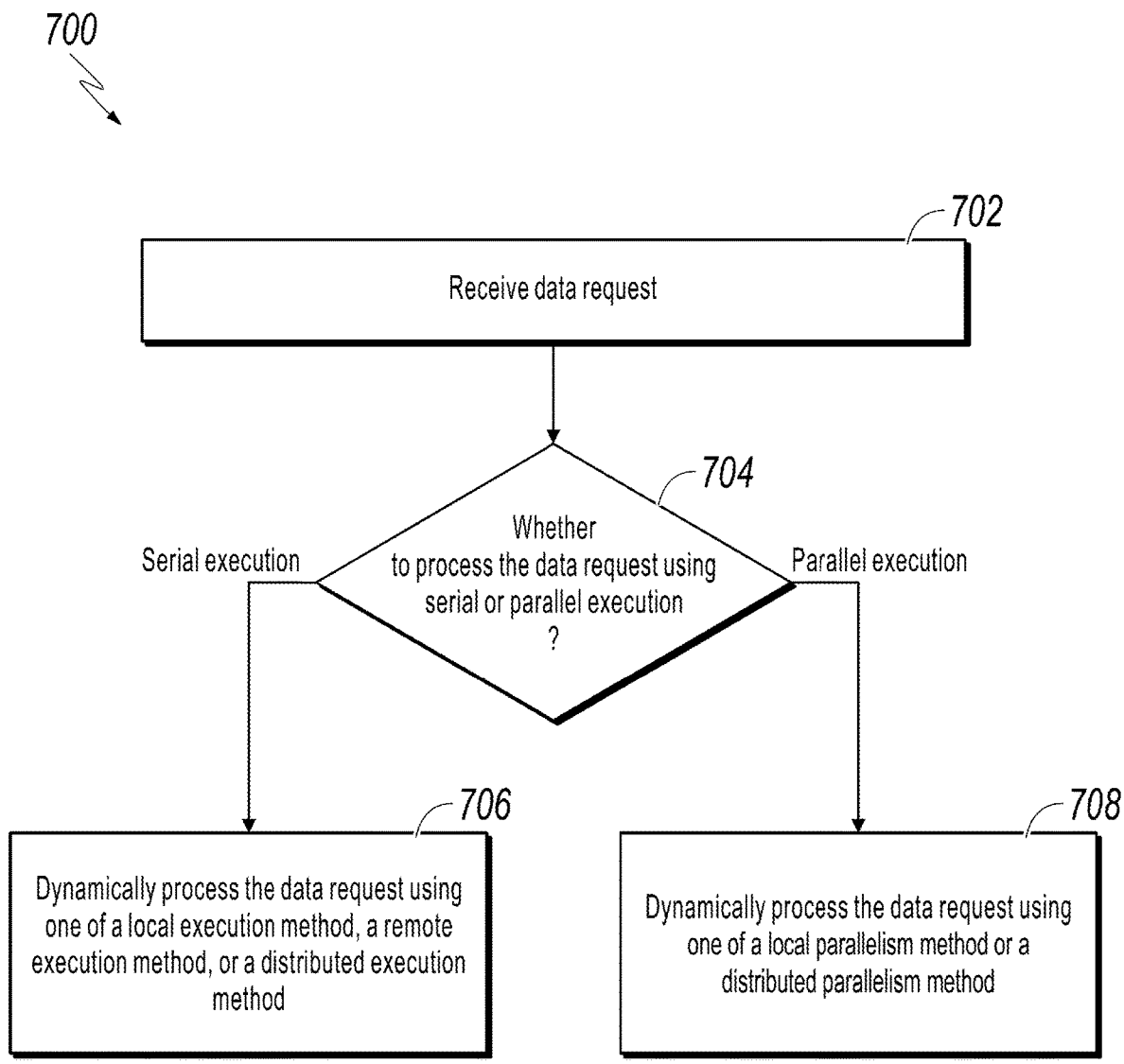
FIG. 7 shows a flowchart of an example process for data request processing, in accordance with some implementations of the present disclosure.

FIG. 7 shows a flowchart of an example process 700 for data request processing, in accordance with some implementations of the present disclosure. Process 700 can be performed by any suitable device disclosed herein, such as hybrid database 200. Accordingly, the following description of process 700 is provided with respect to hybrid database 200. In some implementations, some or all of the operations in process 700 are implemented based on the techniques described in connection with FIGS. 1-5. The operations shown in process 700 may not be exhaustive and that other operations can be performed as well before, after, or in between any of the illustrated operations. Further, some of the operations may be performed simultaneously, or in a different order than shown in FIG. 7.

Process 700 starts when a system, for example, database 200, receives a data request (702). In some implementations, the data request queries data stored in one of more nodes, for example, servers 202*a* and 202*b*, of the system. In some implementations, the system is configured as a hybrid database to dynamically switch between a stand-alone mode and a distributed mode.

In some implementations, the data request is a SQL query. In some examples, a SQL query is a command or statement that is used to retrieve, manipulate, or manage data in a database management system. A SQL query allows users to interact with the database by performing operations such as data retrieval, insertion, deletion, and modification. In some examples, a SQL query includes keywords, expressions, and clauses that define the desired operation on the database. An example of a SQL query is the SELECT statement, which is used to retrieve data from one or more database tables based on specified conditions. Other examples of SQL queries include INSERT, UPDATE, and DELETE statements, which are used to add, modify, or delete data in the database.

In some examples, a SQL query can involve various clauses such as WHERE, JOIN, GROUP BY, HAVING, ORDER BY, and LIMIT, which provide additional filtering, sorting, and grouping functionalities to refine the query results.

The system determines whether to process the data request using serial execution or parallel execution based on a data volume of the queried data (704). In some implementations, the system determines whether to process the data request using serial execution or parallel execution based on one or more of data volume, query complexity, hardware resources, query optimization, data dependencies, system load, or cost-benefit analysis.

In some examples, if the query involves simple operations or a small dataset, serial execution can be sufficient. However, for complex queries involving large datasets or intensive computations, parallel execution can provide performance benefits. In some examples, parallel execution can be used if the system has sufficient parallel processing capabilities. In some examples, serial execution can be used if the optimizer provides an efficient execution plan. If the optimizer struggles to produce an efficient plan, parallel execution can be used to overcome optimization limitations. In some examples, if there are dependencies between different parts of the query, serial execution can be used as parallel execution may introduce conflicts and result in sub-optimal results. In some examples, if the system is already heavily loaded with concurrent queries or processes, serial execution can be used as parallel execution may exacerbate the load and degrade overall performance. In some examples, if the potential gains in performance when using parallel execution outweigh the associated cost that results from using additional hardware resources and requiring more complex query design and administration, parallel execution can be used. If the cost of using parallel execution outweighs the potential gains in performance, serial execution can be used.

In response to determining to process the data request using serial execution, the system dynamically processes the data request, based at least on one or more locations where the queried data is stored, using one of a local execution method, a remote execution method, or a distributed execution method (706).

In some examples, in response to determining that all of the queried data is stored in a first node of the system that initially receives the data request, the first node performs one or more operations on the data stored in the first node.

In some examples, in response to determining that a part of the queried data is stored in one or more remote nodes of the system which are different from the first node that initially receives the data request, the first node acquires the part of the queried data that is stored in the one or more remote nodes, performs one or more operations on a part of the data that is stored in the first node and the acquired data.

In some examples, in response to determining that all of the queried data is stored in a remote node of the system that is different from the first node that initially receives the data request, the first node performs one or more operations on the queried data stored in the remote node, and receives a query result of the data request to from the remote node.

In response to determining to process the data request using parallel execution, the system dynamically processes the data request, based at least on one or more locations where one or more threads for processing the data request run, using one of a local parallelism method or a distributed parallelism method (708).

In some examples, in response to determining that the queried data is stored in more than one node of the system, multiple nodes of the system can perform one or more operations on the queried data in a distributed manner.

In some examples, the system processes the data request using multiple threads. In response to determining that the multiple threads are running on a same node of the system, the system can perform data communication between the multiple threads using a local parallelism method, for example, a memory copy method.

In some examples, the memory copy method can be used to transfer data between different threads or processes that are executing in parallel. The memory copy method can involve copying data from one memory location to another within the system's memory space. The memory copy method can allow different threads or processes to access and operate on their own local copies of shared data, minimizing the need for costly inter-thread or inter-process communication. In some examples, when multiple threads or processes are accessing and modifying shared data structures in memory, a memory copy method can be employed to copy the relevant data from the shared memory into the local memory of each thread or process. This allows each thread or process to work on its local copy independently, avoiding conflicts and ensuring data integrity. In some examples, when a database query is divided into subtasks and executed concurrently by multiple threads or processes, a memory copy method can be used to transfer intermediate query results or subsets of data between the parallel workers. This allows each worker to process its assigned portion of the query independently and combine the results later.

In some examples, in response to determining that the multiple threads are running on different nodes of the system, the system can perform data communication between the multiple threads using a distributed parallelism method, for example, a network communication method. Examples of the network communication method can include message passing, RPC, socket programming, and publish-subscribe systems.

In some examples, threads can communicate by sending messages to each other over the network. Each thread can explicitly send a message containing data or instructions to another thread on a different node. This communication can be synchronous or asynchronous, depending on the specific implementation.

In some examples, threads can communicate using RPCs. A thread on one node can invoke a procedure or function on a different node as if it were a local function call. The RPC mechanism abstracts the network communication details, allowing threads to interact seamlessly.

In some examples, threads can establish network connections using sockets and exchange data through read and write operations. Sockets allow threads to establish client-server communication models, where one thread acts as a server, listening for incoming connections, and the other threads act as clients, connecting to the server for communication.

In some examples, threads can publish messages (events) to specific topics, and other threads that have subscribed to those topics receive the messages.

Figure 8:
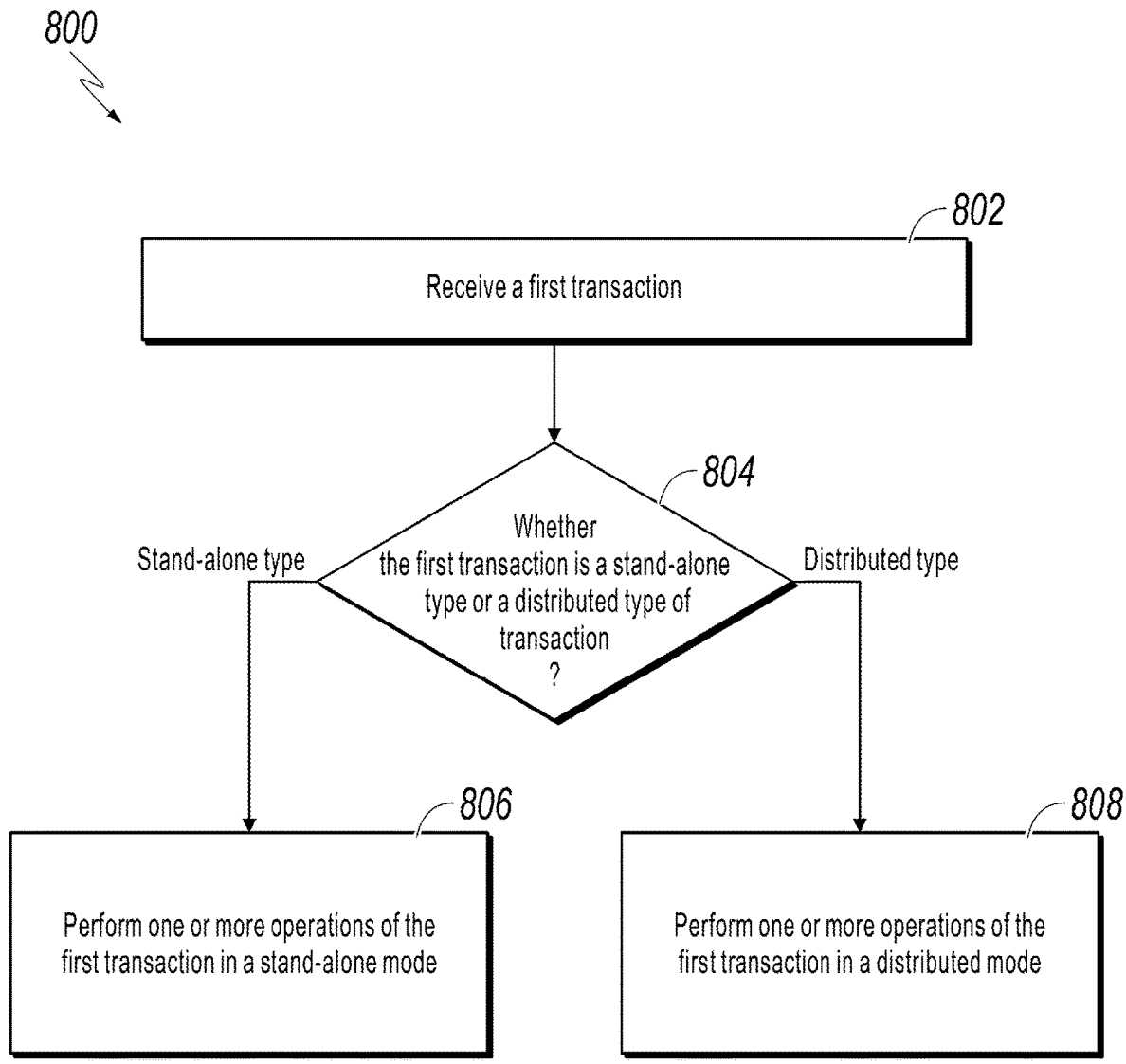
FIG. 8 shows a flowchart of an example process for transaction processing, in accordance with some implementations of the present disclosure.

FIG. 8 shows a flowchart of an example process 800 for transaction processing, in accordance with some implementations of the present disclosure. Process 800 can be performed by any suitable device disclosed herein, such as hybrid database 200. Accordingly, the following description of process 800 is provided with respect to hybrid database 200. In some implementations, some or all of the operations in process 800 are implemented based on the techniques described in connection with FIGS. 1-5. The operations shown in process 800 may not be exhaustive and that other operations can be performed as well before, after, or in between any of the illustrated operations. Further, some of the operations may be performed simultaneously, or in a different order than shown in FIG. 8.

Process 800 starts when a system, for example, database 200, receives a request to execute a first transaction (802). In some implementations, the system is configured as a hybrid database to dynamically switch between a stand-alone mode and a distributed mode.

In some examples, the transaction request includes one or more database operations such as data retrieval, insertion, modification, or deletion. These operations are executed as a cohesive unit, ensuring the integrity and consistency of the data. In some examples, the transaction request can include a transaction identifier or context that uniquely identifies the first transaction. The transaction request can specify the actions to be performed, the data involved, and any conditions or constraints that need to be satisfied for the first transaction to proceed.

The system determines whether the first transaction is a stand-alone type of transaction or a distributed type of transaction (804).

In some implementations, a stand-alone type of transaction is a transaction that operates independently and does not involve any coordination or interaction with other concurrent transactions. In some examples, a stand-alone type of transaction can be a self-contained transaction that executes within the context of a single database session or connection. In some examples, a stand-alone type of transaction is associated with a single log stream. A log stream includes a sequential and continuous flow of transactional records or log entries that capture the activities and changes made to the database. A log stream is a chronological record of operations performed on the database, serving as a persistent and durable history of transaction.

In some implementations, a distributed type of transaction is a transaction that spans multiple nodes or systems in a distributed environment. Execution of a distributed type of transaction can involve coordinating and synchronizing the execution and outcome of the transaction across multiple participating nodes or databases. In a distributed transaction, the operations within the transaction can involve accessing and modifying data that is distributed across different nodes or databases. In some examples, a distributed type of transaction can be associated with multiple log streams.

In response to determining that the first transaction is a stand-alone type of transaction, the system performs one or more operations of the first transaction in the stand-alone mode (806).

In some implementations, the system performs the one or more operations using a one-phase commit method in the stand-alone mode. In some examples, transaction processing in the stand-alone mode includes starting the transaction, performing data manipulation operations such as retrieval, insertion, modification, or deletion on the database. Concurrency control mechanisms are employed to manage concurrent access and maintain data consistency. Validation and integrity checks are conducted to ensure data validity against defined constraints and rules. At the end of the transaction, a decision is made whether to commit the changes, making them permanent, or rollback the transaction, undoing the changes. The transaction concludes with a commit or rollback statement, finalizing the transaction process.

In some implementations, the system determines the first transaction is associated with a single log stream in the stand-alone mode and performs one or more operations of the first transaction on a particular node of the system based on a local timestamp service. In some examples, the system can obtain a transaction version number of the first transaction using the local timestamp service and perform the one or more operations on the particular node based on the obtained transaction version number.

In some examples, the system can obtain the transaction version number of the first transaction using one or more function calls.

In response to determining that the first transaction is a distributed type of transaction, the system performs one or more operations of the first transaction in the distributed mode (808).

In some implementations, the system performs the one or more operations of the first transaction using a modified 2PC method in the distributed mode. In some implementations, the first transaction is considered successfully committed once the prepare phase of the 2PC protocol is completed.

In some implementations, once the prepare phase is completed, the transaction state can be set to committed when all participants of the transaction indicating they are ready to commit. At this point, the transaction is considered committed and can be returned.

In some examples, after receiving the indication that the transaction has been successfully committed after the prepare phase, the system can proceed to the commit phase, and sends a commit request to all participants. Upon receiving the commit request, each participant can apply the changes of the transaction permanently and release any locks or resources held. Finally, each participant responds to the coordinator with an acknowledgment of the commit operation.

In some examples, the system can perform one or more operations on one or more participating nodes of the first transaction based on a global timestamp service. In some examples, the system can obtain a transaction version number of the first transaction using the global timestamp service and perform the one or more operations on the one or more participating nodes of the first transaction based on the obtained transaction version number.

In some examples, the system can obtain the transaction version number of the first transaction using one or more RPCs.

Figure 9:
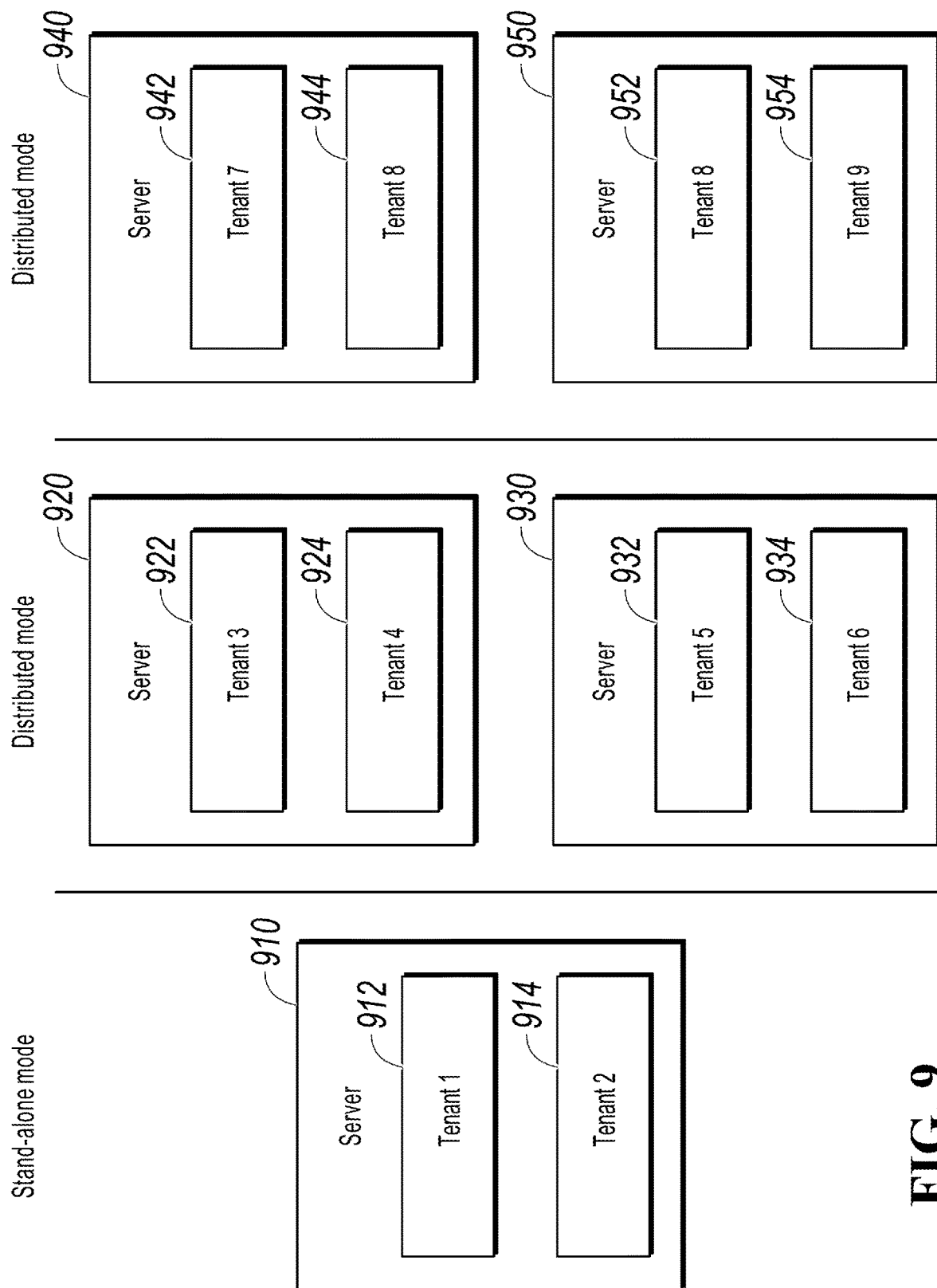
FIG. 9 shows a block diagram of example tenants in a hybrid database, in accordance with some implementations of the present disclosure.

FIG. 9 shows a block diagram of example tenants in a hybrid database, in accordance with some implementations of the present disclosure. In some implementations, servers 910, 920, 930, 940, and 950 are similar to servers 202a and 202b. In such implementations, each one of servers 910, 920, 930, 940, and 950 is configured to perform operations similar to those described with respect to servers 202a and 202b, in addition or as an alternative to the operations described below.

In some implementations, a tenant in a database system is a logical partitioning or segregation of data within the database system. In some examples, tenants are used in multi-tenant architectures, where a single instance of a software application serves multiple customers or tenants while keeping their data separate and isolated. Each tenant in a multi-tenant database can correspond to a distinct organization, customer, or user group that has its own set of data and operates independently of other tenants. The purpose of tenancy is to provide data isolation, security, and scalability, allowing multiple users or organizations to utilize a shared database system while maintaining separation and privacy.

In some implementations, a tenant is identified by a unique identifier, such as a customer ID or domain name, which is used to differentiate their data and enforce access controls. The database schema and tables may be designed in a way that allows the tenant-specific data to be stored and retrieved efficiently, often using techniques like row-level or table-level multitenancy.

By employing a multi-tenant architecture, organizations can benefit from shared resources, reduced infrastructure costs, and simplified maintenance, while still ensuring data separation and privacy among tenants.

In some implementations, tenants can be implemented as either a stand-alone instance or a distributed setup.

In some examples, a stand-alone tenant means that the data and resources associated with that tenant are managed within a single database instance. The entire data of the tenant is contained within one database server, and it operates independently without any distribution of data across multiple nodes. As shown in FIG. 9, tenants 912 and 914 can be stand-alone tenants when the database is in the stand-alone mode, as the data of either tenant 912 or tenant 914 is contained within server 910. Tenants 922, 924, 932, and 934 can also be stand-alone tenants when the database is in the distributed mode, as the entire data of each tenant is contained within one database server.

In some examples, a distributed tenant refers to a setup where the data and resources of a tenant are distributed across multiple nodes or servers within the database. This distribution allows for better scalability, performance, and fault tolerance. As shown in FIG. 9, tenants 944 and 952 belong to a same tenant which can be a distributed tenant when the database is in the distributed mode, as they are distributed in different database servers. Tenants 942 and 954 can be stand-alone tenants when the database is in the distributed mode, as the entire data of each tenant is contained within one database server.

The multi-tenant approach that includes stand-alone tenants and distributed tenants, as described herein, combines the advantages of centralized tenant management and the scalability of a distributed architecture, ensuring efficient performance for each individual tenant within the database.

Figure 10:
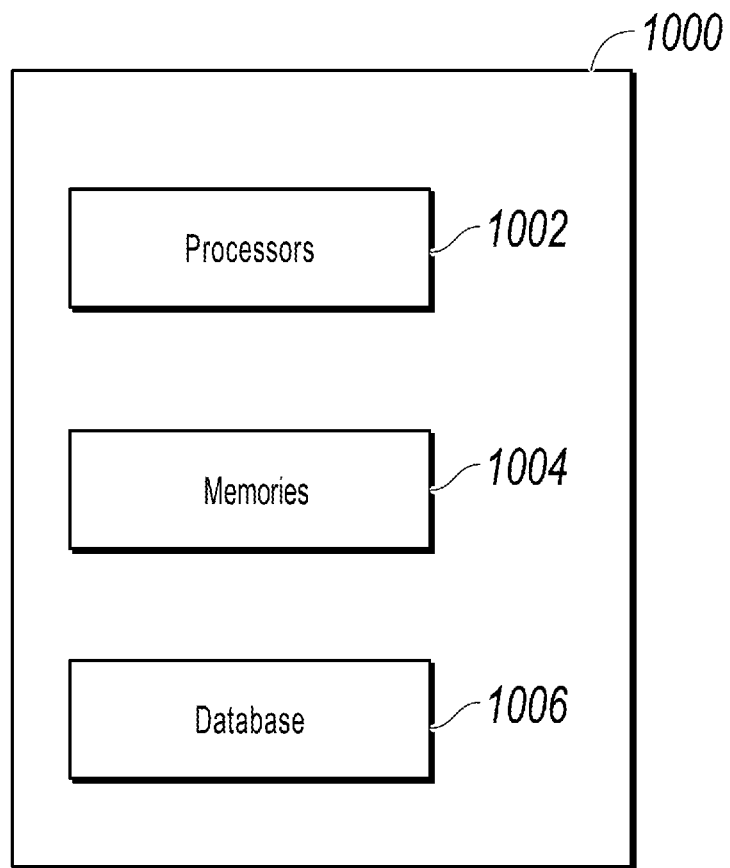
FIG. 10 shows a schematic diagram of an example electronic device, in accordance with some implementations of the present disclosure.

FIG. 10 shows a schematic diagram of an example electronic device 1000, in accordance with some implementations of the present disclosure. In some implementations, electronic device 1000 is an example of one or more of compute nodes 102a-b, data nodes 104a-b, GTM node 106, SLB node 112, server 116, servers 202a-b, and servers 910, 920, 930, 940, and 950. As shown, electronic device 1000 includes one or more processors 1002, one or more memories 1004, and a database 1006. In some implementations, electronic device 1000 further includes one or more systems/components for performing any one or a combination of steps described in the present disclosure.

It is to be noted that although process steps, method steps, algorithms or the like may be described in a sequential order above, such processes, methods and algorithms may generally be configured to work in alternate orders, unless specifically stated to the contrary.

The processes and logic flows described in this document can be performed by one or more programmable processors executing one or more computer programs to perform the functions described herein. The processes and logic flows can also be performed by, and apparatus can also be implemented as, special purpose logic circuitry, for example, an FPGA or an ASIC (application specific integrated circuit).

Processors suitable for the execution of a computer program include, by way of example, both general and special purpose microprocessors, and any one or more processors of any kind of digital computer. Computer readable media suitable for storing computer program instructions and data can include all forms of nonvolatile memory, media and memory devices. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A computer-implemented method for hybrid database implementation, comprising:
   receiving, by a system, an indication to process a data request, wherein the system is configured as a hybrid database to dynamically switch between a stand-alone mode and a distributed mode;
   when the indication indicates to the system to process the data request in the stand-alone mode:
     switching, by the system, the hybrid database to the stand-alone mode; and
     processing, by the system, the data request in the stand-alone mode, wherein processing the data request in the stand-alone mode comprises: determining that the data request is associated with a single log stream; and in response to determining that the data request is associated with a single log stream, processing the data request based on a local timestamp service; and
   when the indication indicates to the system to process the data request in the distributed mode:
     switching, by the system, the hybrid database to the distributed mode; and
     processing, by the system, the data request in the distributed mode.

2. The computer-implemented method of claim 1, wherein the system comprises a plurality of computer nodes, and each computer node of the plurality of computer nodes comprises a Structured Query Language (SQL) engine, a transaction engine, and a storage engine.

3. The computer-implemented method of claim 2, wherein the hybrid database comprises a SQL layer, a transaction layer, and a storage layer, and wherein:
the SQL layer comprises a plurality of SQL engines, wherein each SQL engine of the plurality of SQL engine is a SQL engine comprised in one of the plurality of computer nodes,
the transaction layer comprises a plurality of transaction engines, wherein each transaction engine of the plurality of transaction engines is a transaction engine comprised in one of the plurality of computer nodes, and
the storage layer comprises a plurality of storage engines, wherein each storage engine of the plurality of storage engines is a storage engine comprised in one of the plurality of computer nodes.

4. The computer-implemented method of claim 1, wherein the data request comprises a transaction or a SQL query.

5. The computer-implemented method of claim 1, wherein processing, by the system, the data request in the stand-alone mode, comprises:
processing, using a single-process-multiple-thread model, the data request.

6. The computer-implemented method of claim 1, wherein processing, by the system, the data request in the stand-alone mode, comprises:
processing, using one or more function calls, the data request by a particular computer node of the system.

7. The computer-implemented method of claim 1, wherein processing, by the system, the data request in the distributed mode, comprises:
processing, using one or more remote procedure calls (RPCs) by a plurality of computer nodes, the data request.

8. The computer-implemented method of claim 1, wherein the hybrid database comprises a plurality of tenants, and wherein:
when the hybrid database is switched to the stand-alone mode, each one of the plurality of tenants is a stand-alone type of tenant; and
when the hybrid database is switched to the distributed mode,
each one of the plurality of tenants is a stand-alone type of tenant; or
at least one of the plurality of tenants is a distributed type of tenant.

9. A system for hybrid database implementation, the system comprising:
one or more processors; and
one or more computer-readable memories coupled to the one or more processors and having instructions stored thereon, wherein the instructions are executable by the one or more processors to perform operations comprising:
receiving an indication to process a data request, wherein the system is configured as a hybrid database to dynamically switch between a stand-alone mode and a distributed mode;
when the indication indicates to the system to process the data request in the stand-alone mode:
switching the hybrid database to the stand-alone mode; and
processing the data request in the stand-alone mode, wherein processing the data request in the stand-alone mode comprises: determining that the data request is associated with a single log stream; and in response to determining that the data request is associated with a single log stream, processing the data request based on a local timestamp service; and
when the indication indicates to the system to process the data request in the distributed mode:
switching the hybrid database to the distributed mode; and
processing the data request in the distributed mode.

10. The system of claim 9, wherein the system comprises a plurality of computer nodes, and each computer node of the plurality of computer nodes comprises a Structured Query Language (SQL) engine, a transaction engine, and a storage engine.

11. The system of claim 10, wherein the hybrid database comprises a SQL layer, a transaction layer, and a storage layer, and wherein:
the SQL layer comprises a plurality of SQL engines, wherein each SQL engine of the plurality of SQL engine is a SQL engine comprised in one of the plurality of computer nodes,
the transaction layer comprises a plurality of transaction engines, wherein each transaction engine of the plurality of transaction engines is a transaction engine comprised in one of the plurality of computer nodes, and
the storage layer comprises a plurality of storage engines, wherein each storage engine of the plurality of storage engines is a storage engine comprised in one of the plurality of computer nodes.

12. The system of claim 9, wherein the data request comprises a transaction or a SQL query.

13. The system of claim 9, wherein processing the data request in the stand-alone mode, comprises:
processing, using a single-process-multiple-thread model, the data request.

14. The system of claim 9, wherein processing the data request in the stand-alone mode, comprises:
processing, using one or more function calls, the data request by a particular computer node of the system.

15. The system of claim 9, wherein processing the data request in the distributed mode, comprises:
processing, using one or more remote procedure calls (RPCs) by a plurality of computer nodes, the data request.

16. The system of claim 9, wherein the hybrid database comprises a plurality of tenants, and wherein:
when the hybrid database is switched to the stand-alone mode, each one of the plurality of tenants is a stand-alone type of tenant; and
when the hybrid database is switched to the distributed mode,
each one of the plurality of tenants is a stand-alone type of tenant; or
at least one of the plurality of tenants is a distributed type of tenant.

17. An apparatus, the apparatus comprising:
one or more processors; and
one or more computer-readable memories coupled to the one or more processors and having instructions stored thereon, wherein the instructions are executable by the one or more processors to perform operations comprising:
receiving an indication to process a data request, wherein the apparatus is configured as a hybrid database to dynamically switch between a stand-alone mode and a distributed mode;

when the indication indicates to the apparatus to process the data request in the stand-alone mode:
  switching the hybrid database to the stand-alone mode; and
  processing the data request in the stand-alone mode, wherein processing the data request in the stand-alone mode comprises: determining that the data request is associated with a single log stream; and in response to determining that the data request is associated with a single log stream, processing the data request based on a local timestamp service; and
when the indication indicates to the apparatus to process the data request in the distributed mode:
  switching the hybrid database to the distributed mode; and
  processing the data request in the distributed mode.

18. The apparatus of claim 17, wherein the apparatus comprises a Structured Query Language (SQL) engine, a transaction engine, and a storage engine.

19. The apparatus of claim 17, wherein the data request comprises a transaction or a SQL query.

20. The apparatus of claim 17, wherein processing the data request in the stand-alone mode, comprises:
  processing, using a single-process-multiple-thread model, the data request.

* * * * *